US008538801B2

(12) United States Patent  (10) Patent No.: US 8,538,801 B2
Giordano et al.  (45) Date of Patent: Sep. 17, 2013

(54) SYSTEM AND METHOD FOR PROCESSING FINANCIAL TRANSACTIONS

(75) Inventors: Joseph Giordano, Centreville, VA (US); Jack Murray, Fairfax, VA (US)

(73) Assignee: ExxonMobile Research & Engineering Company, Fairfax, VA (US)

( * ) Notice: Subject to any disclaimer, the term of this patent is extended or adjusted under 35 U.S.C. 154(b) by 1223 days.

(21) Appl. No.: 10/083,249

(22) Filed: Feb. 27, 2002

(65) Prior Publication Data

US 2002/0152123 A1  Oct. 17, 2002

Related U.S. Application Data

(63) Continuation-in-part of application No. 09/505,721, filed on Feb. 17, 2000, now Pat. No. 7,571,139.

(60) Provisional application No. 60/120,760, filed on Feb. 19, 1999, provisional application No. 60/271,408, filed on Feb. 27, 2001, provisional application No. 60/278,431, filed on Mar. 26, 2001.

(51) Int. Cl.
*G07B 15/02* (2011.01)
*G06Q 20/00* (2012.01)
*G06Q 40/00* (2012.01)
*G06F 17/00* (2006.01)

(52) U.S. Cl.
USPC ............... 705/13; 705/16; 705/39; 705/40; 700/241; 700/231; 700/232

(58) Field of Classification Search
USPC ........... 705/35–38, 14, 34; 455/406; 141/98, 141/94, 2
See application file for complete search history.

(56) References Cited

U.S. PATENT DOCUMENTS

| | | | |
|---|---|---|---|
| 3,184,714 A | 5/1965 | Brown, Jr et al. | |
| 3,527,268 A | 9/1970 | Ginsburg | |
| 3,536,109 A | 10/1970 | Ginsburg et al. | |
| 3,602,881 A * | 8/1971 | Bayne et al. | 340/928 |
| 3,639,894 A | 2/1972 | Tanaka | |
| 3,641,569 A | 2/1972 | Bushnell et al. | |
| 3,642,036 A | 2/1972 | Ginsburgh et al. | |
| 3,670,303 A | 6/1972 | Dame | |
| 3,765,567 A | 10/1973 | Maiocco et al. | |
| 3,873,019 A | 3/1975 | Holcomb | |
| 3,931,497 A | 1/1976 | Gentile et al. | |
| 3,952,285 A | 4/1976 | Falck, Jr. | |
| 4,075,632 A | 2/1978 | Baldwin et al. | |

(Continued)

FOREIGN PATENT DOCUMENTS

| | | |
|---|---|---|
| BR | 9803356-5 | 5/2000 |
| DE | 4012842 | 10/1991 |

(Continued)

OTHER PUBLICATIONS

PCT—International Search Report dated Apr. 24, 2003 for Application No. PCT/US02/21876, filed Feb. 27, 2002.

(Continued)

*Primary Examiner* — Gregory Johnson
(74) *Attorney, Agent, or Firm* — Hunton & Williams LLP

(57) ABSTRACT

The invention relates generally to retail transactions and, more particularly, to systems and methods for monitoring consumer behavior and for providing a secure electronic payment in exchange for goods and services.

18 Claims, 20 Drawing Sheets

(56) References Cited

U.S. PATENT DOCUMENTS

| | | |
|---|---|---|
| 4,199,100 A | 4/1980 | Wostl et al. |
| 4,278,977 A | 7/1981 | Nossen |
| 4,313,168 A | 1/1982 | Stephens et al. |
| 4,325,146 A | 4/1982 | Lennington |
| 4,333,072 A | 6/1982 | Beigel |
| 4,335,426 A | 6/1982 | Maxwell et al. |
| 4,338,587 A | 7/1982 | Chiappetti |
| 4,361,837 A | 11/1982 | Malinowski et al. |
| 4,384,288 A | 5/1983 | Walton |
| 4,395,626 A | 7/1983 | Barker et al. |
| 4,395,627 A | 7/1983 | Barker et al. |
| 4,398,172 A | 8/1983 | Carroll et al. |
| 4,399,437 A | 8/1983 | Falck et al. |
| 4,404,639 A | 9/1983 | McGuire et al. |
| 4,454,414 A | 6/1984 | Benton |
| 4,511,970 A | 4/1985 | Okano et al. |
| 4,555,618 A | 11/1985 | Riskin |
| 4,614,945 A | 9/1986 | Brunius et al. |
| 4,631,708 A | 12/1986 | Wood et al. |
| 4,658,371 A | 4/1987 | Walsh et al. |
| 4,691,202 A | 9/1987 | Denne et al. |
| 4,728,955 A | 3/1988 | Hane |
| 4,730,188 A | 3/1988 | Milheiser |
| 4,739,328 A | 4/1988 | Koelle et al. |
| 4,747,049 A | 5/1988 | Richardson et al. |
| 4,799,059 A | 1/1989 | Grindahl et al. |
| 4,804,961 A | 2/1989 | Hane |
| 4,829,540 A | 5/1989 | Waggener, Sr. et al. |
| 4,862,162 A | 8/1989 | Daley |
| 4,864,615 A | 9/1989 | Bennett et al. |
| 4,870,419 A | 9/1989 | Baldwin et al. |
| 4,881,581 A | 11/1989 | Hollerback |
| 4,882,779 A | 11/1989 | Rahtgen |
| 4,906,826 A | 3/1990 | Spencer |
| 4,912,471 A | 3/1990 | Tyburski et al. |
| 4,916,296 A | 4/1990 | Streck |
| 4,918,955 A | 4/1990 | Kimura et al. |
| 4,932,049 A | 6/1990 | Lee |
| 4,977,501 A | 12/1990 | Lefevre |
| 4,989,146 A | 1/1991 | Imajo |
| 5,025,139 A | 6/1991 | Halliburton, Jr. |
| 5,041,826 A | 8/1991 | Milheiser |
| 5,047,613 A | 9/1991 | Swegen et al. |
| 5,059,951 A | 10/1991 | Kaltner |
| 5,073,781 A | 12/1991 | Stickelbrocks |
| 5,113,183 A | 5/1992 | Mizuno et al. |
| 5,124,697 A | 6/1992 | Moore |
| 5,132,687 A | 7/1992 | Baldwin et al. |
| 5,144,312 A | 9/1992 | McCann |
| 5,144,553 A | 9/1992 | Hassett et al. |
| 5,144,667 A | 9/1992 | Pogue, Jr. et al. |
| 5,146,068 A | 9/1992 | Ugawa et al. |
| 5,153,583 A * | 10/1992 | Murdoch ............... 340/10.34 |
| 5,156,198 A | 10/1992 | Hall |
| 5,164,985 A | 11/1992 | Nysen et al. |
| 5,166,676 A | 11/1992 | Milheiser |
| 5,175,416 A | 12/1992 | Mansvelt et al. |
| 5,192,954 A | 3/1993 | Brockelsby et al. |
| 5,195,092 A * | 3/1993 | Wilson et al. ................. 725/146 |
| 5,200,601 A | 4/1993 | Jarvis |
| 5,204,512 A | 4/1993 | Ieki et al. |
| 5,211,129 A | 5/1993 | Taylor et al. |
| 5,214,409 A | 5/1993 | Beigel |
| 5,228,084 A | 7/1993 | Johnson et al. |
| 5,253,162 A | 10/1993 | Hassett |
| 5,257,011 A | 10/1993 | Beigel |
| 5,270,717 A | 12/1993 | Schuermann |
| 5,287,112 A | 2/1994 | Schuermann |
| 5,294,782 A | 3/1994 | Kumar |
| 5,294,931 A | 3/1994 | Meier |
| 5,310,999 A * | 5/1994 | Claus et al. ................... 235/384 |
| 5,311,186 A | 5/1994 | Utsu et al. |
| 5,317,318 A * | 5/1994 | Thomas et al. ................. 342/44 |
| 5,321,753 A | 6/1994 | Gritton |
| 5,325,082 A | 6/1994 | Rodriguez |
| 5,327,066 A | 7/1994 | Smith |
| 5,340,969 A | 8/1994 | Cox |
| 5,343,906 A | 9/1994 | Tibbals, III |
| 5,347,280 A | 9/1994 | Schuermann |
| 5,349,332 A | 9/1994 | Ferguson et al. |
| 5,351,052 A | 9/1994 | D'Hont et al. |
| 5,352,877 A | 10/1994 | Morley |
| 5,355,120 A | 10/1994 | Ferguson et al. |
| 5,355,137 A | 10/1994 | Schurmann |
| 5,369,706 A | 11/1994 | Latka |
| 5,374,930 A | 12/1994 | Schuermann |
| 5,376,778 A | 12/1994 | Kreft |
| 5,377,097 A | 12/1994 | Fuyama et al. |
| 5,377,270 A | 12/1994 | Koopman, Jr. et al. |
| 5,383,500 A | 1/1995 | Dwars et al. |
| 5,384,850 A | 1/1995 | Johnson et al. |
| 5,388,165 A | 2/1995 | Deaton et al. |
| 5,392,049 A | 2/1995 | Gunnarsson |
| 5,396,251 A | 3/1995 | Schuermann |
| 5,410,315 A | 4/1995 | Huber |
| 5,414,427 A | 5/1995 | Gunnarsson |
| 5,418,751 A | 5/1995 | Kaiser |
| 5,422,624 A | 6/1995 | Smith |
| 5,428,363 A | 6/1995 | D'Hont |
| 5,430,441 A * | 7/1995 | Bickley et al. ............... 340/10.2 |
| 5,430,447 A | 7/1995 | Meier |
| 5,432,518 A | 7/1995 | van Erven |
| 5,434,394 A * | 7/1995 | Roach et al. ................... 235/375 |
| 5,434,572 A | 7/1995 | Smith |
| 5,438,335 A | 8/1995 | Schuermann |
| 5,444,448 A | 8/1995 | Schuermann et al. |
| 5,444,742 A | 8/1995 | Grabow et al. |
| 5,448,242 A | 9/1995 | Sharpe et al. |
| 5,448,638 A | 9/1995 | Johnson et al. |
| 5,450,086 A | 9/1995 | Kaiser |
| 5,450,087 A | 9/1995 | Hurta et al. |
| 5,450,088 A | 9/1995 | Meier et al. |
| 5,450,492 A | 9/1995 | Hook et al. |
| 5,451,758 A | 9/1995 | Jesadanont |
| 5,451,958 A | 9/1995 | Schuermann |
| 5,451,959 A | 9/1995 | Schuermann |
| 5,453,747 A | 9/1995 | D'Hont et al. |
| 5,455,575 A | 10/1995 | Schuermann |
| 5,457,461 A | 10/1995 | Schuermann |
| 5,461,386 A | 10/1995 | Knebelkamp |
| 5,471,212 A | 11/1995 | Sharpe et al. |
| 5,471,668 A | 11/1995 | Soenen et al. |
| 5,471,669 A | 11/1995 | Lidman |
| 5,477,040 A * | 12/1995 | Lalonde ........................ 235/380 |
| 5,479,171 A | 12/1995 | Schuermann |
| 5,482,139 A | 1/1996 | Rivalto |
| 5,485,520 A | 1/1996 | Chaum et al. |
| 5,488,376 A | 1/1996 | Hurta et al. |
| 5,489,773 A | 2/1996 | Kumar |
| 5,489,908 A | 2/1996 | Orthmann et al. |
| 5,491,483 A | 2/1996 | D'Hont |
| 5,491,484 A | 2/1996 | Schuermann |
| 5,491,715 A | 2/1996 | Flaxl |
| 5,493,291 A | 2/1996 | Bruggemann |
| 5,493,315 A | 2/1996 | Atchley |
| 5,495,250 A | 2/1996 | Ghaem et al. |
| 5,499,181 A | 3/1996 | Smith |
| 5,500,651 A | 3/1996 | Schuermann |
| 5,508,705 A | 4/1996 | Spiess |
| 5,525,992 A * | 6/1996 | Froschermeier ............. 340/10.2 |
| 5,525,994 A * | 6/1996 | Hurta et al. ..................... 342/51 |
| 5,539,189 A | 7/1996 | Wilson |
| 5,541,604 A | 7/1996 | Meier |
| 5,543,798 A | 8/1996 | Schuermann |
| 5,546,523 A | 8/1996 | Gatto |
| 5,548,291 A | 8/1996 | Meier et al. |
| 5,550,358 A | 8/1996 | Tait et al. |
| 5,550,536 A | 8/1996 | Flaxl |
| 5,550,548 A | 8/1996 | Schuermann |
| 5,554,984 A | 9/1996 | Shigenaga et al. |
| 5,557,268 A | 9/1996 | Hughes et al. |
| 5,557,279 A | 9/1996 | D'Hont |
| 5,557,529 A | 9/1996 | Warn et al. |
| 5,561,430 A | 10/1996 | Knebelkamp |

| | | | | | | |
|---|---|---|---|---|---|---|
| 5,572,555 A | | 11/1996 | Soenen et al. | 5,864,323 A | 1/1999 | Berthon |
| 5,574,470 A | * | 11/1996 | de Vall ... 343/895 | 5,867,100 A | 2/1999 | D'Hont |
| 5,587,712 A | | 12/1996 | Boone et al. | 5,870,031 A | 2/1999 | Kaiser et al. |
| 5,590,038 A | | 12/1996 | Pitroda | 5,873,025 A | 2/1999 | Evans et al. |
| 5,592,150 A | | 1/1997 | D'Hont | 5,873,068 A | 2/1999 | Beaumont et al. |
| 5,594,448 A | | 1/1997 | d'Hont | 5,874,896 A | 2/1999 | Lowe et al. |
| 5,598,475 A | | 1/1997 | Soenen et al. | 5,878,403 A | 3/1999 | DeFrancesco et al. |
| 5,602,375 A | | 2/1997 | Sunahara et al. | 5,884,271 A | 3/1999 | Pitroda |
| 5,602,538 A | | 2/1997 | Orthmann et al. | 5,890,520 A | 4/1999 | Johnson, Jr. |
| 5,602,745 A | | 2/1997 | Atchley et al. | 5,892,706 A | 4/1999 | Shimizu et al. |
| 5,602,919 A | * | 2/1997 | Hurta et al. ... 705/65 | 5,895,457 A | 4/1999 | Kurowski et al. |
| 5,605,182 A | | 2/1997 | Oberrecht et al. | 5,901,303 A | 5/1999 | Chew |
| 5,608,406 A | | 3/1997 | Eberth et al. | 5,902,985 A | 5/1999 | Bos et al. |
| 5,609,190 A | * | 3/1997 | Anderson et al. ... 141/59 | 5,906,228 A | 5/1999 | Keller |
| 5,612,890 A | | 3/1997 | Strasser et al. | 5,915,243 A | 6/1999 | Smolen |
| 5,619,207 A | | 4/1997 | d'Hont | 5,917,913 A | 6/1999 | Wang |
| 5,621,396 A | | 4/1997 | Flaxl | 5,923,572 A | 7/1999 | Pollock |
| 5,621,411 A | | 4/1997 | Hagl et al. | 5,924,080 A | 7/1999 | Johnson |
| 5,621,412 A | | 4/1997 | Sharpe et al. | 5,929,801 A | 7/1999 | Aslanidis et al. |
| 5,625,370 A | | 4/1997 | D'Hont | 5,933,096 A | 8/1999 | Tsuda |
| 5,628,351 A | * | 5/1997 | Ramsey et al. ... 141/98 | 5,933,812 A | 8/1999 | Meyer et al. |
| 5,629,981 A | | 5/1997 | Nerlikar | 5,942,978 A | * | 8/1999 | Shafer ... 340/572.9 |
| 5,634,503 A | * | 6/1997 | Musil et al. ... 141/232 | 5,948,040 A | * | 9/1999 | DeLorme et al. ... 701/201 |
| 5,637,845 A | | 6/1997 | Kolls | 5,948,116 A | 9/1999 | Aslanidis et al. |
| 5,637,846 A | | 6/1997 | Boers et al. | 5,949,043 A | 9/1999 | Hayashida |
| 5,638,875 A | | 6/1997 | Corfitsen | 5,952,922 A | 9/1999 | Shober |
| 5,640,002 A | * | 6/1997 | Ruppert et al. ... 235/462.46 | 5,955,969 A | 9/1999 | D'Hont |
| 5,644,119 A | | 7/1997 | Padula et al. | 5,956,259 A | 9/1999 | Hartsell, Jr. et al. |
| 5,644,723 A | | 7/1997 | Deaton et al. | 5,962,829 A | 10/1999 | Yoshinaga |
| 5,648,767 A | | 7/1997 | O'Connor et al. | 5,969,691 A | * | 10/1999 | Myers ... 343/834 |
| 5,657,388 A | | 8/1997 | Weiss | 5,970,148 A | 10/1999 | Meier |
| 5,663,548 A | | 9/1997 | Hayashi et al. | 5,971,042 A | 10/1999 | Hartsell, Jr. |
| 5,668,591 A | * | 9/1997 | Shintani ... 725/140 | 5,979,753 A | 11/1999 | Roslak |
| 5,668,876 A | | 9/1997 | Falk et al. | 5,979,757 A | 11/1999 | Tracy et al. |
| 5,675,342 A | | 10/1997 | Sharpe | 5,988,510 A | 11/1999 | Tuttle et al. |
| 5,677,955 A | * | 10/1997 | Doggett et al. ... 705/76 | 5,991,749 A | 11/1999 | Morrill, Jr. |
| 5,680,459 A | * | 10/1997 | Hook et al. ... 705/65 | 5,995,015 A | 11/1999 | DeTemple et al. |
| 5,686,920 A | * | 11/1997 | Hurta et al. ... 342/42 | 6,000,608 A | 12/1999 | Dorf |
| 5,687,322 A | | 11/1997 | Deaton et al. | 6,012,049 A | 1/2000 | Kawan |
| 5,691,731 A | | 11/1997 | van Erven | 6,014,634 A | 1/2000 | Scroggie et al. |
| 5,694,326 A | | 12/1997 | Warn et al. | 6,016,476 A | 1/2000 | Maes et al. |
| 5,701,127 A | | 12/1997 | Sharpe | 6,018,718 A | 1/2000 | Walker et al. |
| 5,717,374 A | | 2/1998 | Smith | 6,021,399 A | 2/2000 | Demers et al. |
| 5,721,781 A | | 2/1998 | Deo et al. | 6,024,142 A | * | 2/2000 | Bates ... 141/94 |
| 5,724,028 A | | 3/1998 | Prokup | 6,025,780 A | 2/2000 | Bowers et al. |
| 5,727,153 A | | 3/1998 | Powell | 6,025,799 A | 2/2000 | Ho et al. |
| 5,729,236 A | | 3/1998 | Flaxl | 6,026,375 A | * | 2/2000 | Hall et al. ... 705/26.43 |
| 5,729,697 A | | 3/1998 | Schkolnick et al. | 6,026,868 A | 2/2000 | Johnson, Jr. |
| 5,731,957 A | | 3/1998 | Brennan | 6,032,703 A | 3/2000 | Baker et al. |
| 5,732,401 A | | 3/1998 | Conway | 6,036,090 A | 3/2000 | Rahman et al. |
| 5,739,766 A | | 4/1998 | Chaloux | 6,037,879 A | 3/2000 | Tuttle |
| 5,742,229 A | | 4/1998 | Smith | 6,038,549 A | 3/2000 | Davis et al. |
| 5,751,227 A | | 5/1998 | Yoshida et al. | 6,038,551 A | 3/2000 | Barlow et al. |
| 5,757,286 A | * | 5/1998 | Jonsson et al. ... 340/937 | 6,039,244 A | 3/2000 | Finsterwald |
| 5,764,789 A | | 6/1998 | Pare, Jr. et al. | 6,039,247 A | 3/2000 | Reccia et al. |
| 5,774,873 A | * | 6/1998 | Berent et al. ... 705/26.3 | 6,041,314 A | 3/2000 | Davis |
| 5,790,410 A | | 8/1998 | Warn et al. | 6,045,040 A | 4/2000 | Streicher et al. |
| 5,793,028 A | | 8/1998 | Wagener et al. | 6,046,668 A | 4/2000 | Forster |
| 5,793,324 A | | 8/1998 | Aslanidis et al. | 6,046,680 A | 4/2000 | Soenen et al. |
| 5,796,832 A | | 8/1998 | Kawan | 6,046,683 A | 4/2000 | Pidwerbetsky et al. |
| 5,797,470 A | | 8/1998 | Bohnert et al. | 6,055,521 A | 4/2000 | Ramsey et al. |
| 5,798,709 A | | 8/1998 | Flaxl | 6,055,573 A | 4/2000 | Gardenswartz et al. |
| 5,798,931 A | | 8/1998 | Kaehler | 6,061,344 A | 5/2000 | Wood, Jr. |
| 5,805,082 A | * | 9/1998 | Hassett ... 340/928 | 6,064,320 A | 5/2000 | d'Hont et al. |
| 5,819,234 A | * | 10/1998 | Slavin et al. ... 340/10.4 | 6,067,297 A | 5/2000 | Beach |
| 5,825,302 A | | 10/1998 | Stafford | 6,068,030 A | 5/2000 | Tatsuno |
| 5,832,083 A | | 11/1998 | Iwayama et al. | 6,070,147 A | 5/2000 | Harms et al. |
| 5,832,377 A | | 11/1998 | Soenen et al. | 6,070,156 A | * | 5/2000 | Hartsell, Jr. ... 705/413 |
| 5,832,457 A | | 11/1998 | O'Brien et al. | 6,070,803 A | * | 6/2000 | Stobbe ... 235/492 |
| 5,841,364 A | | 11/1998 | Hagl et al. | 6,072,801 A | 6/2000 | Wood, Jr. et al. |
| 5,842,188 A | | 11/1998 | Ramsey et al. | 6,073,840 A | * | 6/2000 | Marion ... 235/381 |
| 5,850,187 A | | 12/1998 | Carrender et al. | 6,078,251 A | 6/2000 | Landt et al. |
| 5,856,809 A | | 1/1999 | Schoepfer | 6,078,888 A | * | 6/2000 | Johnson, Jr. ... 705/50 |
| 5,857,175 A | | 1/1999 | Day et al. | 6,079,621 A | 6/2000 | Vardanyan et al. |
| 5,857,501 A | | 1/1999 | Kelerich et al. | 6,082,618 A | 7/2000 | Brown |
| 5,859,414 A | | 1/1999 | Grimes et al. | 6,084,530 A | 7/2000 | Pidwerbetsky et al. |
| 5,859,416 A | | 1/1999 | Gatto | 6,085,805 A | 7/2000 | Bates |
| 5,859,587 A | | 1/1999 | Alicot et al. | 6,087,954 A | * | 7/2000 | McSpadden et al. ... 340/4.1 |
| 5,862,222 A | * | 1/1999 | Gunnarsson ... 705/77 | 6,089,284 A | * | 7/2000 | Kaehler et al. ... 141/94 |

| | | | |
|---|---|---|---|
| 6,092,052 A | 7/2000 | Ziarno | |
| 6,098,048 A | 8/2000 | Dashefsky et al. | |
| 6,098,879 A * | 8/2000 | Terranova | 235/384 |
| 6,104,290 A | 8/2000 | Naguleswaran | |
| 6,104,291 A | 8/2000 | Beauvillier et al. | |
| 6,105,006 A | 8/2000 | Davis et al. | |
| 6,109,525 A * | 8/2000 | Blomqvist et al. | 235/384 |
| 6,112,152 A * | 8/2000 | Tuttle | 701/115 |
| 6,112,981 A | 9/2000 | McCall | |
| 6,116,298 A | 9/2000 | Haimovich et al. | |
| 6,116,505 A | 9/2000 | Withrow | |
| 6,118,189 A | 9/2000 | Flaxl | |
| 6,119,099 A * | 9/2000 | Walker et al. | 705/16 |
| 6,129,274 A | 10/2000 | Suzuki | |
| 6,130,602 A | 10/2000 | O'Toole et al. | |
| 6,130,623 A | 10/2000 | MacLellan et al. | |
| 6,133,834 A | 10/2000 | Eberth et al. | |
| 6,136,357 A | 10/2000 | Dietl | |
| 6,138,911 A | 10/2000 | Fredregill et al. | |
| 6,138,912 A | 10/2000 | Mitsuno | |
| 6,140,941 A | 10/2000 | Dwyer et al. | |
| 6,145,741 A | 11/2000 | Wisdom et al. | |
| 6,149,055 A | 11/2000 | Gatto | |
| 6,157,230 A | 12/2000 | O'Toole et al. | |
| 6,157,321 A * | 12/2000 | Ricci | 340/902 |
| 6,157,871 A | 12/2000 | Terranova | |
| 6,160,734 A | 12/2000 | Henderson et al. | |
| 6,167,236 A | 12/2000 | Kaiser et al. | |
| 6,169,483 B1 | 1/2001 | Ghaffari et al. | |
| 6,177,858 B1 | 1/2001 | Raimbault et al. | |
| 6,177,860 B1 | 1/2001 | Cromer et al. | |
| 6,179,206 B1 | 1/2001 | Matsumori | |
| 6,182,893 B1 | 2/2001 | Greene et al. | |
| 6,184,846 B1 | 2/2001 | Myers et al. | |
| 6,185,307 B1 | 2/2001 | Johnson, Jr. | |
| 6,191,705 B1 | 2/2001 | Oomen et al. | |
| 6,195,541 B1 * | 2/2001 | Griffith | 455/406 |
| 6,198,382 B1 * | 3/2001 | Berger et al. | 340/10.34 |
| 6,198,764 B1 | 3/2001 | Schuermann et al. | |
| 6,213,391 B1 | 4/2001 | Lewis | |
| 6,215,437 B1 | 4/2001 | Schurmann et al. | |
| 6,219,543 B1 | 4/2001 | Myers et al. | |
| 6,219,613 B1 | 4/2001 | Terrier et al. | |
| 6,236,223 B1 * | 5/2001 | Brady et al. | 324/750.3 |
| 6,239,675 B1 | 5/2001 | Flaxl | |
| 6,249,227 B1 | 6/2001 | Brady et al. | |
| 6,257,486 B1 | 7/2001 | Teicher et al. | |
| 6,259,353 B1 * | 7/2001 | Berger et al. | 340/10.1 |
| 6,259,367 B1 | 7/2001 | Klein | |
| 6,263,316 B1 * | 7/2001 | Khan et al. | 705/13 |
| 6,263,319 B1 * | 7/2001 | Leatherman | 705/30 |
| 6,264,103 B1 | 7/2001 | Stanley | |
| 6,275,476 B1 | 8/2001 | Wood, Jr. | |
| 6,282,186 B1 | 8/2001 | Wood, Jr. | |
| 6,282,516 B1 | 8/2001 | Giuliani | |
| 6,289,324 B1 | 9/2001 | Kawan | |
| 6,292,786 B1 | 9/2001 | Deaton et al. | |
| 6,298,330 B1 | 10/2001 | Gardenswartz et al. | |
| 6,301,471 B1 * | 10/2001 | Dahm et al. | 455/405 |
| 6,302,527 B1 | 10/2001 | Walker | |
| 6,307,847 B1 | 10/2001 | Wood, Jr. | |
| 6,311,162 B1 | 10/2001 | Reichwein et al. | |
| 6,311,167 B1 | 10/2001 | Davis et al. | |
| 6,311,214 B1 | 10/2001 | Rhoads | |
| 6,313,737 B1 * | 11/2001 | Freeze et al. | 340/10.1 |
| 6,317,028 B1 | 11/2001 | Valiulis | |
| 6,321,894 B1 | 11/2001 | Johnsson | |
| 6,321,984 B1 | 11/2001 | McCall et al. | |
| 6,323,566 B1 * | 11/2001 | Meier | 307/10.2 |
| 6,325,285 B1 | 12/2001 | Baratelli | |
| 6,326,934 B1 | 12/2001 | Kinzie | |
| 6,330,543 B1 | 12/2001 | Kepecs | |
| 6,332,025 B2 | 12/2001 | Takahashi et al. | |
| 6,332,128 B1 | 12/2001 | Nicholson | |
| 6,334,575 B1 | 1/2002 | Su-Hui | |
| 6,335,686 B1 | 1/2002 | Goff et al. | |
| 6,340,116 B1 | 1/2002 | Cecil et al. | |
| 6,343,241 B1 | 1/2002 | Kohut et al. | |
| 6,359,570 B1 | 3/2002 | Adcox et al. | |
| 6,360,138 B1 | 3/2002 | Coppola et al. | |
| 6,360,208 B1 | 3/2002 | Ohanian et al. | |
| 6,441,740 B1 * | 8/2002 | Brady et al. | 340/572.7 |
| 6,467,685 B1 * | 10/2002 | Teicher | 235/379 |
| 6,470,233 B1 * | 10/2002 | Johnson, Jr. | 700/237 |
| 6,538,563 B1 * | 3/2003 | Heng | 340/10.2 |
| 6,574,603 B1 * | 6/2003 | Dickson et al. | 705/15 |
| 6,618,362 B1 * | 9/2003 | Terranova | 370/328 |
| 6,725,202 B1 * | 4/2004 | Hurta et al. | 705/13 |
| 6,810,304 B1 * | 10/2004 | Dickson | 700/241 |
| 6,882,900 B1 * | 4/2005 | Terranova | 700/237 |
| 7,421,410 B1 * | 9/2008 | Schechtman et al. | 705/43 |
| 2001/0011229 A1 * | 8/2001 | Anderson et al. | 705/14 |
| 2001/0013011 A1 | 8/2001 | Day et al. | |
| 2001/0018660 A1 * | 8/2001 | Sehr | 705/5 |
| 2001/0020198 A1 | 9/2001 | Wilson | |
| 2001/0029488 A1 | 10/2001 | Takeshima et al. | |
| 2001/0034565 A1 | 10/2001 | Leatherman | |
| 2001/0037249 A1 | 11/2001 | Fitzgerald et al. | |
| 2001/0039512 A1 | 11/2001 | Nicholson | |
| 2001/0045460 A1 | 11/2001 | Reynolds et al. | |
| 2001/0051920 A1 | 12/2001 | Joao et al. | |
| 2002/0002538 A1 | 1/2002 | Ling | |
| 2002/0008639 A1 * | 1/2002 | Dee | 340/932.2 |
| 2002/0011517 A1 | 1/2002 | Namekawa et al. | |
| 2002/0011519 A1 | 1/2002 | Shults, III | |
| 2002/0014952 A1 | 2/2002 | Terranova | |
| 2002/0016740 A1 | 2/2002 | Ogasawara | |
| 2002/0019811 A1 | 2/2002 | Lapsley et al. | |
| 2002/0022967 A1 | 2/2002 | Ohkado | |
| 2002/0026380 A1 | 2/2002 | Su | |
| 2002/0032649 A1 | 3/2002 | Selvarajan | |
| 2002/0032664 A1 | 3/2002 | Ikuta | |
| 2002/0034978 A1 | 3/2002 | Legge et al. | |
| 2002/0035622 A1 | 3/2002 | Barber | |
| 2002/0084889 A1 * | 7/2002 | Bolavage et al. | 340/10.1 |
| 2002/0105440 A1 * | 8/2002 | Bostrom et al. | 340/928 |
| 2002/0111886 A1 * | 8/2002 | Chenevich et al. | 705/30 |
| 2002/0111916 A1 * | 8/2002 | Coronna et al. | 705/64 |
| 2002/0113082 A1 * | 8/2002 | Leatherman et al. | 222/52 |
| 2002/0178063 A1 * | 11/2002 | Gravelle et al. | 705/17 |
| 2003/0014357 A1 * | 1/2003 | Chrisekos et al. | 705/39 |

FOREIGN PATENT DOCUMENTS

| | | |
|---|---|---|
| DE | 4013147 | 10/1991 |
| DE | 4107803 | 9/1992 |
| DE | 19646153 | 5/1998 |
| DE | 19701167 | 7/1998 |
| EP | 391559 | 10/1990 |
| EP | 0461888 | 12/1991 |
| EP | 469762 | 2/1992 |
| EP | 503782 | 9/1992 |
| EP | 609694 | 8/1994 |
| EP | 644515 | 3/1995 |
| EP | 665971 | 8/1995 |
| EP | 0696021 | 2/1996 |
| EP | 0723241 | 7/1996 |
| EP | 0725376 | 8/1996 |
| EP | 793086 | 9/1997 |
| EP | 0887776 | 12/1998 |
| EP | 888593 | 1/1999 |
| EP | 0907134 | 4/1999 |
| EP | 907938 | 4/1999 |
| EP | 913796 | 5/1999 |
| EP | 925552 | 6/1999 |
| EP | 0930590 | 7/1999 |
| EP | 943584 | 9/1999 |
| EP | 955612 | 11/1999 |
| EP | 967580 | 12/1999 |
| EP | 974940 | 1/2000 |
| EP | 1017614 | 7/2000 |
| EP | 0795165 | 9/2000 |
| EP | 1039408 | 9/2000 |
| EP | 1052603 | 11/2000 |
| FR | 2600318 | 6/1986 |
| FR | 2764099 | 12/1998 |
| GB | 2222714 | 3/1990 |
| GB | 2224418 | 5/1990 |
| GB | 2227209 | 7/1990 |

| | | |
|---|---|---|
| GB | 2229845 | 10/1990 |
| GB | 2245865 | 1/1992 |
| GB | 2252847 | 8/1992 |
| GB | 2253591 | 9/1992 |
| GB | 2255046 | 10/1992 |
| GB | 2257092 | 1/1993 |
| GB | 2257944 | 1/1993 |
| GB | 2266794 | 11/1993 |
| GB | 2267683 | 12/1993 |
| GB | 2279611 | 1/1995 |
| GB | 2279612 | 1/1995 |
| GB | 2279613 | 1/1995 |
| GB | 2329301 | 3/1999 |
| JP | 223465 | 2/1990 |
| JP | 02046061 | 2/1990 |
| JP | 04024153 | 1/1992 |
| JP | 5229599 | 5/1993 |
| JP | 06103178 | 4/1994 |
| JP | 668317 | 6/1994 |
| JP | 6176251 | 6/1994 |
| JP | 08316717 | 11/1996 |
| JP | 09325993 | 12/1997 |
| JP | 2000030150 | 1/2000 |
| JP | 2000134220 | 5/2000 |
| WO | WO 90/08365 | 7/1990 |
| WO | WO 92/18977 | 10/1992 |
| WO | WO 93/00661 | 1/1993 |
| WO | WO 94/03391 | 2/1994 |
| WO | WO 94/05592 | 3/1994 |
| WO | WO 94/06031 | 3/1994 |
| WO | WO 94/16396 | 7/1994 |
| WO | WO 95/14612 | 6/1995 |
| WO | WO 95/16971 | 6/1995 |
| WO | WO 95/32919 | 12/1995 |
| WO | WO 96/27891 | 9/1996 |
| WO | WO 96/28789 | 9/1996 |
| WO | WO 96/28791 | 9/1996 |
| WO | WO 96/39351 | 12/1996 |
| WO | WO 97/24689 | 7/1997 |
| WO | WO 97/21626 | 9/1997 |
| WO | WO 97/35284 | 9/1997 |
| WO | WO 98/10363 | 3/1998 |
| WO | WO 98/21713 | 5/1998 |
| WO | WO 98/38601 | 9/1998 |
| WO | WO 98/55952 | 12/1998 |
| WO | WO 99/04374 | 1/1999 |
| WO | WO 99/12116 | 3/1999 |
| WO | WO 99/16700 | 4/1999 |
| WO | WO 99/16701 | 4/1999 |
| WO | WO 99/16702 | 4/1999 |
| WO | WO 99/16703 | 4/1999 |
| WO | WO 99/41717 | 8/1999 |
| WO | WO 99/42962 | 8/1999 |
| WO | WO 99/53409 | 10/1999 |
| WO | WO 00/07121 | 2/2000 |
| WO | WO 00/12362 | 3/2000 |
| WO | WO 00/52655 | 9/2000 |
| WO | WO 00/55752 | 9/2000 |
| WO | WO 00/58917 | 10/2000 |
| WO | WO 00/72463 | 11/2000 |
| WO | WO 01/22304 | 3/2001 |
| WO | WO 03/058391 | 7/2003 |
| WO | WO 03/058947 | 7/2003 |

OTHER PUBLICATIONS

Snow, C. Matthew, "Mobile uses IT to speed past competition," Cutting Edge, Business Advantage, Datamation, Oct. 1997, vol. 43, No. 10, pp. 14-15.
"Budget to Test Automated Return System" (Article).
Identification Devices, Inc., "Automated Vehicle Identification System I.D.", Nov. 1986 (brochure).
*Speedpass* Advertisement: "A Legacy of Firsts", *Scientific American*, pp. 89-92.
U.S. Appl. No. 08/768,723, filed Dec. 18, 1996, Giordano.
U.S. Appl. No. 09/224,027, filed Dec. 31, 1998, Giordano.
Lobred, P., "BP Plans Robotic Pump, Mobil May Follow Suit," U.S. Oil Week, Oct. 1997, vol. 34 No. 43, pp. 1-2.
Koch, W.H., "Robotic Fueling," Petroleum Equipment & Technology, Sep.-Oct. 1997, pp. 14, 16-18, 49.
Autofill Europe AB, "No, She Is Not Drawing Cash From Her Bank Account. She Is Filling Her Car Up."; "Autofill. Another Breakthrough In Man's Quest to Eliminate Life's Everyday Problems."; "Faster. Cleaner. Safer. And Right Now."; "Autofill. It Fills Much More Than Just Fuel. It Fills a Need.", (Undated).
Callanan, J., "Can Fueling Developments in Dispenser Technology Aim to Make Fueling Up a 'Gas' for Motorists . . . ," The Journal of Petoleum Marketing, Jul. 1997, pp. 3, 16-18.
M-Commerce Wallet-Like Transactions, (Undated).
Venture Development Corporation, "Retail Automation Equipment: A Vertical Market Analysis of Usage and Plans for Wireless, Emergeing, and Traditional Technoligies," Pub Time: Jul. 2002 (via www.the-infoshop.com).
Dove Consulting, Indutry Report, "Trasponders. The New Way to Pay?," Apr. 2001, pp. 1-4.
Ingenico, *Evolution of Payment at the Point of Sale*, Printed 2002.
Texas Instruments, "Customer Loyalty Mechanism With TI*RFID," 2000 (via www.ti.com/tiris/docs/aolutions/pos/loyalty.htm).
ISIT.com, "The Cutting Edge of RFID Technology and Applications for Manufacturing and Distribution," 2001 (via www.isit.com/feature.cfm?articleid=3516&tech=AIDC).
"RFID Links on the Web," (via http://home.att.net/?randall.j.jackson/rfidlinks.htm), Mar. 22, 2002.
Texas Instruments, *TRIS News*, 1998, Issue No. 18.

* cited by examiner

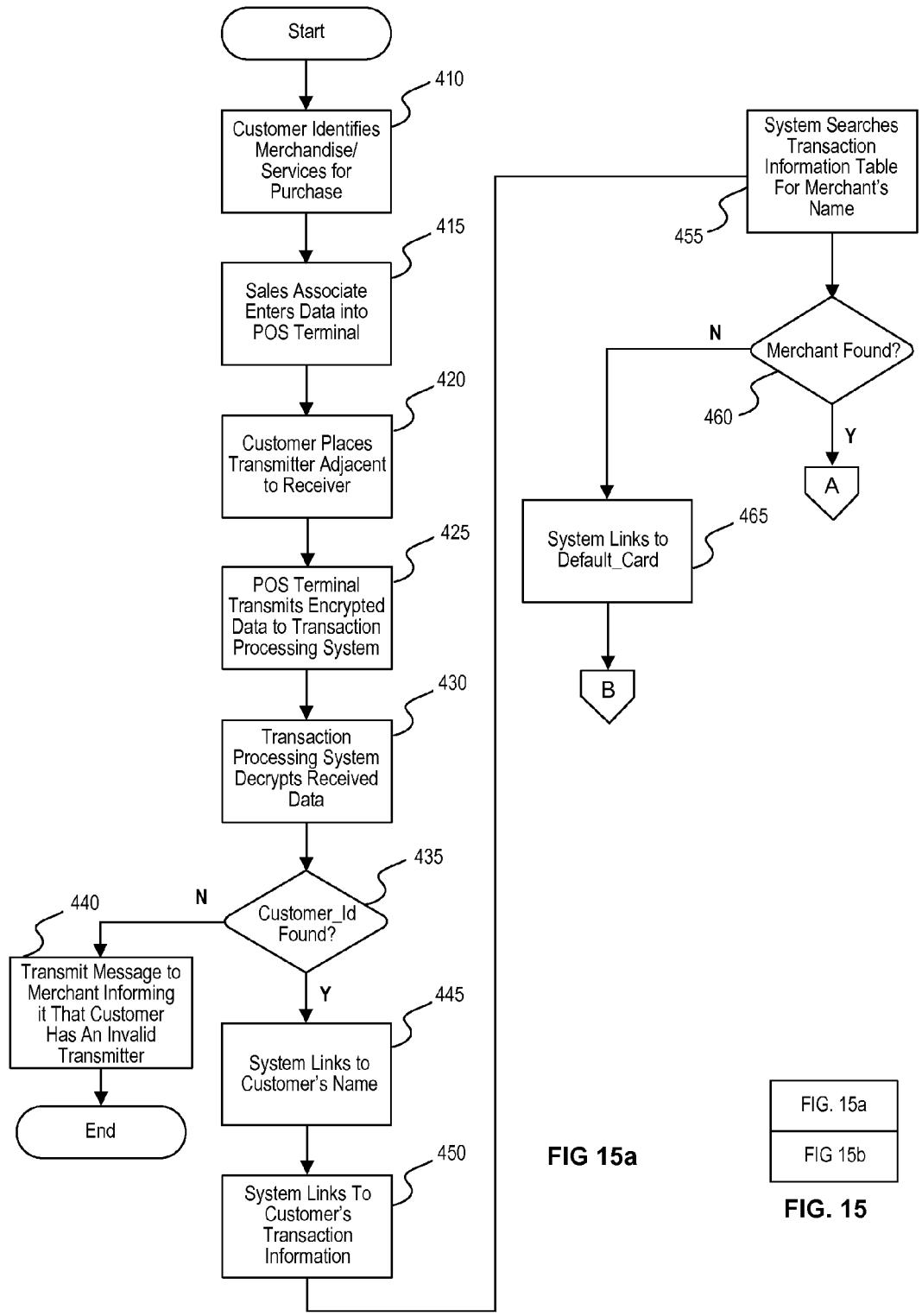

SYSTEM AND METHOD FOR PROCESSING FINANCIAL TRANSACTIONS

This application claims priority in U.S. application Ser. No. 09/505,721, filed Feb. 17, 2000; and U.S. Provisional Application Nos. 60/120,760, 60/271,408, and 60/278,431, filed Feb. 19, 1999, Feb. 27, 2001, and Mar. 26, 2001, respectively. These cited applications are incorporated herein by reference.

FIELD OF THE INVENTION

The invention relates generally to retail transactions and, more particularly, to systems and methods for monitoring consumer behavior and for providing a secure electronic payment in exchange for goods and services.

DESCRIPTION OF THE RELATED ART

Retail store chains survive on high sales volumes and low profit margins. Accordingly, retail professionals are constantly searching for cost-effective mechanisms to encourage consumers to shop at their retail stores and for efficient low-cost methods to process completed retail transactions. In the past, the most common approach utilized by retailers for motivating customers to shop in a particular establishment was to provide purchasing incentives to their customers, usually in the form of printed discount coupons. These coupons have been distributed to customers either through mass mailings or in a more focused manner, based on a customer's previous purchasing habits. Coupons have also been given to customers in retail stores, either from kiosks or at the checkout stand, in response to the customer's purchase of some preselected item or items.

Retailers have come to realize that the more efficient approach to encouraging consumers to shop at their retail store is to identify loyal customers and to offer incentives to them in response to their continued loyalty. Implementing systems that track customer purchasing trends for the purpose of identifying loyal customers can be prohibitively expensive. Furthermore, promoting retail store loyalty is a time-consuming process that necessitates determining consumer needs, which vary across demographic boundaries, and then providing the goods that satisfy those needs. Unfortunately, the process of analyzing collected consumer data is also expensive, time-consuming, and of limited use. Regional and national consumer demographics data available from Nielson and other agencies regarding consumer product movement is predictably too general to be useful to specific retailers. Additionally, these agencies do not address product movement demographics that would allow retailers to learn the particular needs and buying habits of people purchasing specific products.

An alternative to the traditional loyalty program that does not require demographics data is one in which increased sales and customer loyalty is obtained through a reward system. For example, the airline industry rewards loyal customers using frequent flyer programs. Attempts have also been made to develop "frequent shopper" marketing and sales promotion services in retail sales. Other retailers have experimented with programs that reward frequent shoppers by distributing cards to customers who regularly purchase name brand goods manufactured by a particular vendor. Cards are used at participating retail stores to identify the customer and record purchases of particular brand goods and to award points based on the number of brand good purchases. Points are accumulated, and gifts are given to the card member based on a predetermined criteria.

Unfortunately, none of these services completely address or meet the needs and interests of modern retailers. For example, many of these existing programs encourage "brand loyalty" or "retail store loyalty," but do not permit the retailer to reward across brands (co-branding) or across retailers. Specifically, none of these services allow a retail store owner to reward purchase of Coca Cola™ products with a discount on Frito Lay™ snacks. Furthermore, none of these services allow a Wendy's™ franchise owner to reward the purchase of a predetermined number of Wendy's™ products with a complementary oil change at Jiffy Lube™ for example. Moreover, none of these services allow a retailer to associate particular consumer groups with specific consumer needs. For example, in the grocery retail business in the United States, double income families are pressed for time and show a trend toward less time being spent shopping and preparing meals. Retail grocers are challenged to provide incentives to encourage these kinds of shoppers into their stores. Retailers and consumers alike could benefit from systems that allow retailers to identify health conscious consumers and to offer incentives that appeal to the consumer's need for natural and/or healthy foods. Identifying those shoppers having special dietary needs, e.g., medical problems and then marketing to those dietary needs may be particularly advantageous to retailers. Providing products that appeal to certain groups instead of offering generic grocery items may also be profitable.

Complicating the reality that modern-day loyalty programs do not meet the needs of the modern retailer is the fact that an increasing number of retail store customers also own personal computers with many having access to computer network services that provide connections to the Internet. Although some computer sites connected to the World Wide Web have begun to offer "online" shopping services, and some services have proposed to deliver discount coupons through a computer network, the full potential of online delivery of incentives has not been realized.

Aside from restricting the growth of loyalty programs, it is widely suspected that the emergence of the World Wide Web has also created an avenue for increased consumer exposure to fraudulent "online" transactions. Internet-based payment solutions give unprecedented access to personal information by uninvited eavesdroppers. Conducting these types of transactions over the Internet consequently requires additional security measures that are not found in conventional transaction processing networks. This additional requirement is necessitated by the fact that Internet communication is performed over publicly-accessible, unsecured communication lines in stark contract to the private, dedicated phone line service utilized between a traditional "brick and mortar" merchant and a credit authorizing organization. As an example, FIG. 1 is a diagrammatic representation of a conventional system 10 for processing retail non-cash transactions. A customer enters a merchant store 12 and makes a purchase using a credit card issued for example, by one of a plurality of credit card issuing agencies such as a bank or payment processing system 16. Merchant store 12 may be one of a large number of similar stores, all owned or managed by a common parent corporation or headquarters 14. A record of each credit card transaction, regardless of which card was used, is transmitted by a dedicated communications channel 13 to merchant corporation headquarters 14 of the retail outlet 12. A processor at merchant corporation headquarters 14 analyzes the credit card transaction records received and then routes the transaction, along a second dedicated communications channel 15, to an appropriate payment processing system 16, according to the identification of the particular credit card used in the original transaction.

Compare that to the situation that arises when an online consumer purchases goods and services over the Internet. As shown in FIG. 2, when a consumer 18 transmits credit card information to an online merchant 24, the information passes through countless servers 21 and routers 22 on its way to the online merchant 24. Along the way, the information can easily be scanned and scrutinized by numerous interlopers (not shown). Thus, it is critical that any retail processing system utilizing the Internet or any other unsecured network as a communication medium, must employ some form of security or encryption.

In view of the shortcomings of currently available online transaction processing systems and methods, it is desirable to provide a system and method that increases customer convenience and security. It is also desirable to provide a system and method that allows merchants to easily compile demographics data for use in designing customer loyalty and incentive programs.

SUMMARY OF THE INVENTION

The present invention satisfies the above-described need by providing a system and method for processing consumer transactions. In the systems of the present invention, a consumer located in a retail establishment identifies goods or services to be purchased and then communicates payment information to the merchant by transmitting an identification signal via a wireless customer transceiver to a merchant transceiver coupled to a point of sale (POS) device. Once the merchant transceiver captures the customer ID, it passes it to a POS device that then combines the customer ID, merchant ID and transaction data into an authorization request. The POS device then transmits the data to a transaction processing system (host computer) where the customer's payment method is identified. For payment methods requiring authorization, a request for authorization is transmitted to the appropriate payment processing center. Once the payment processing center authorizes the transaction, it transmits an authorization code back to the POS device via the transaction processing system. Since the system never transmits a customer's credit card or debit card number across an unsecured link, it provides a heightened degree of security over prior art systems. Also, by communicating with the merchant via a wireless customer transceiver, the system increases customer confidence that their credit card number or other payment data will not be impermissibly accessed and fraudulently utilized by nefarious retail store employees. The system also provides a much greater degree of convenience to participating customers since it allows them to preassign specific payment methods to specific retail establishments, and to have the preassigned payment methods automatically selected by the transaction processing system whenever the customer utilizes his/her wireless customer transceiver in the merchant's retail establishment.

The system also provides unprecedented benefits to merchants. Most importantly, the transaction processing system which is networked to the merchant's in-store POS devices, and to the merchant's on-line shopping network, allows merchants to quickly and efficiently process non-cash transactions for in-store and on-line customers, using the same system. Also, since a merchant can track the purchasing history of each customer who uses the transaction processing system to authorize payments, the merchant may provide for targeted incentives to the customer based on his or her prior purchases, regardless of their method of origination (in-store or online). Moreover, the transaction processing system's association with a plurality of different merchants allows a merchant associated with the system to couple its incentive program with that of another participating merchant, thereby allowing customer loyalty to be awarded across multiple merchants.

In another aspect, the present invention provides a method for securely processing financial transactions over the Internet or other unsecured network. The method includes utilizing a wireless customer transceiver to transmit a customer's ID to a transceiver coupled to the customer's computer. The computer identifies the desired product from a merchant's online website and transmits the customer ID and the product information to the transaction processing system. As in the case of an embodiment, the transaction processing system identifies the selected payment method and transmits the authorization request to the appropriate payment processing center. Once the transaction processor authorizes the transaction, it transmits an authorization code to the online merchant and the merchandise is then delivered to the customer's address. In addition to transmitting a transaction authorization, the transaction processing system also may transmit identification information and other data unique to the associated customer in the absence of a retail transaction. An additional embodiment of a transaction processing system includes a system capable of transmitting instructions to a vendor based on receipt of a customer ID (e.g., issue a ticket to the customer, provide access to the customer, etc.).

In yet another aspect, the present invention provides a method for associating a customer's preferences with his or her customer ID. For example, a fast food restaurant chain may choose to collect and store a description of a customer's favorite meal so that when the customer transmits his ID to a merchant transceiver located in the fast food restaurant, his favorite meal is ordered and payment processing occurs, without the customer uttering a single word.

To achieve these and other advantages, and in accordance with the purpose of the invention as embodied and broadly described, the invention provides a system for processing retail transactions. The system comprises a wireless customer transceiver preprogrammed with a unique customer/transmitter ID number, and a merchant transceiver that captures the customer/transmitter ID and forwards it to an associated POS device. The POS device receives transaction data via an input device and combines the transaction data with the received ID signal from the reader to form an authorization request. At least a portion of the authorization request may be encrypted to further enhance security. The POS device transmits the authorization request over a communications channel to the transaction processing system that includes a processor and a customer information database. The customer information database includes a plurality of customer entries with associated transaction processing attributes. The processor receives the authorization request, decrypts it (if necessary) and transmits it to the payment processing system in accordance with the customer's predetermined choice of payment method. The processor also stores data derived from a transaction entry associated with the customer ID. In addition to processing transactions, the system facilitates the collection and analysis of comprehensive demographics and purchasing data for managing consumer loyalty programs and performing trend analysis of consumer purchasing trends.

It is to be understood that both the foregoing general descriptions and the following detailed description are exemplary and explanatory and are intended to provide further explanation of the invention as claimed.

Additional features and advantages of the invention will be set forth in the description which follows, and in part will be apparent from the description, or may be learned by practice of the invention. The objectives and other advantages of the invention will be realized and attained by the methods, systems, and apparatus particularly pointed out in the written description and claims hereof, as well as the accompanying drawings.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF PREFERRED EMBODIMENTS

Figure 1:
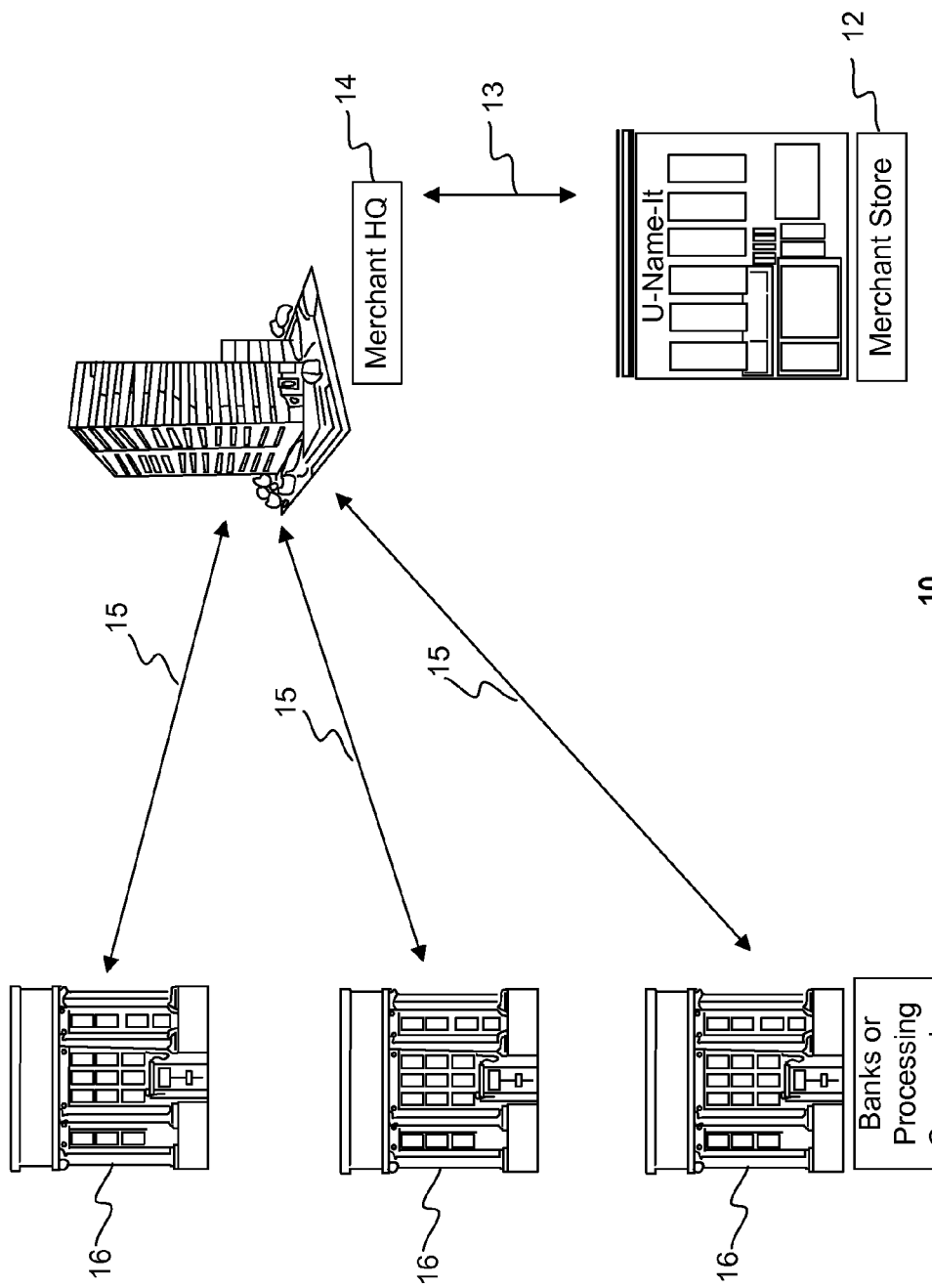
FIG. 1 is a diagram illustrating a conventional retail credit card transaction processing system.
Figure 2:
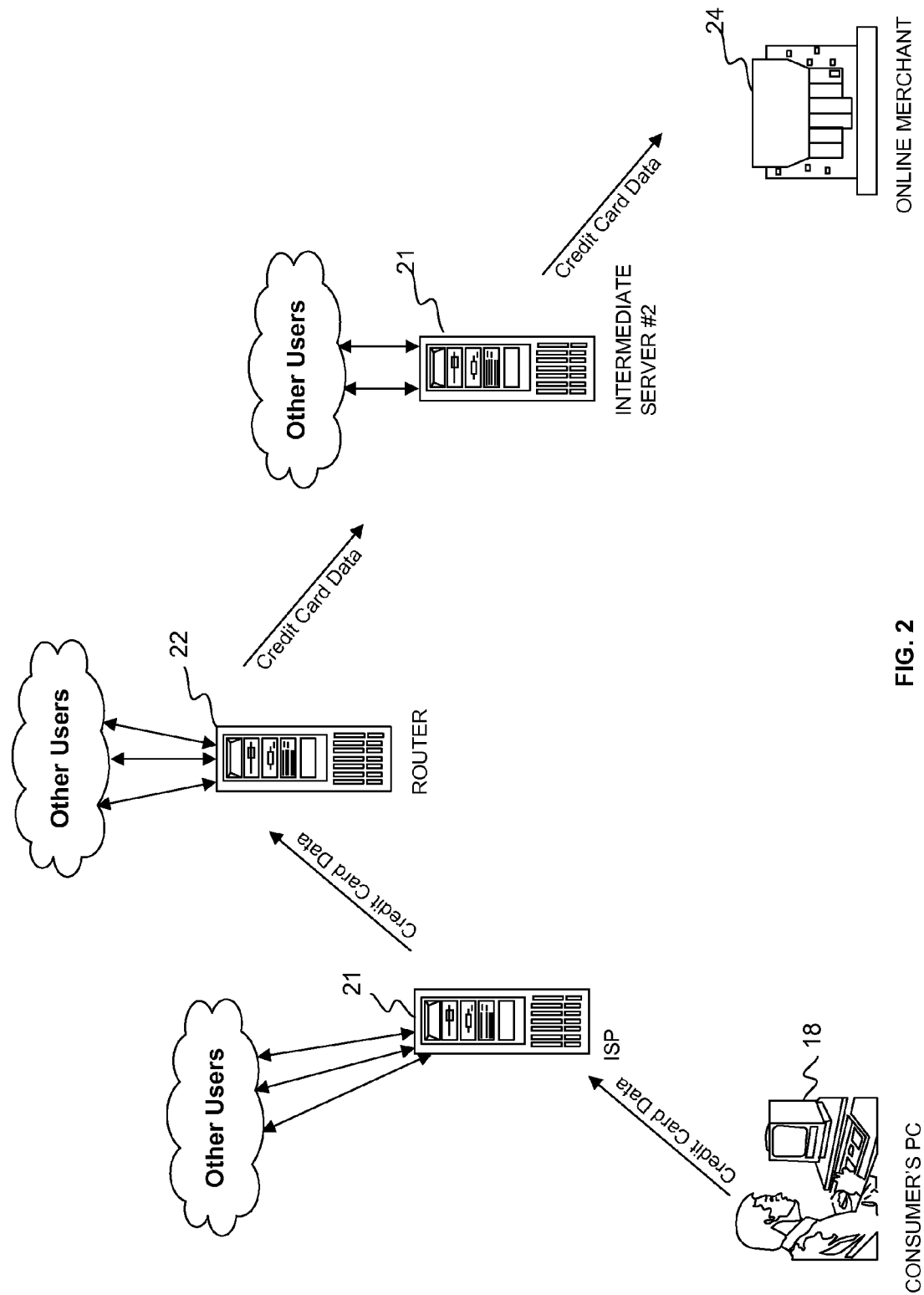
FIG. 2 is a diagram illustrating a conventional online computer system for purchasing goods and services over the Internet.

In the following detailed description of preferred embodiments, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

To achieve these and other advantages, and in accordance with the purpose of the invention as embodied and broadly described, the invention provides a system for processing retail transactions. The system comprises a customer transceiver preprogrammed with a unique customer/transmitter ID number, and a merchant transceiver that receives a customer identification signal from the customer transceiver and then forwards the received customer ID signal to an associated POS device. The POS device receives transaction data via an input device and combines the transaction data with the customer ID signal to form an authorization request, in those cases when the payment method requires authorization. The POS device transmits the authorization request over a communications channel to a transaction processing system that includes a processor and a customer information database comprised of a plurality of customer entries with associated transaction processing attributes. The processor receives the authorization request and transmits it to the payment processing system dictated by the customer's payment choice for the transaction. The processor also stores data derived from a transaction entry associated with the customer ID. In addition to processing transactions, the system facilitates the collection and analysis of comprehensive demographics and purchasing data for managing consumer loyalty programs and performing trend analysis of consumer purchasing trends.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures residing in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general digital computers or other similar processing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, workstations, or personal computers are connected via communication links of various types. In a client server arrangement, programs and data, many in the form of objects, are made available by various members of the system.

Referring now to the remaining figures, corresponding reference characters refer to corresponding elements, wherever possible.

Figure 3:
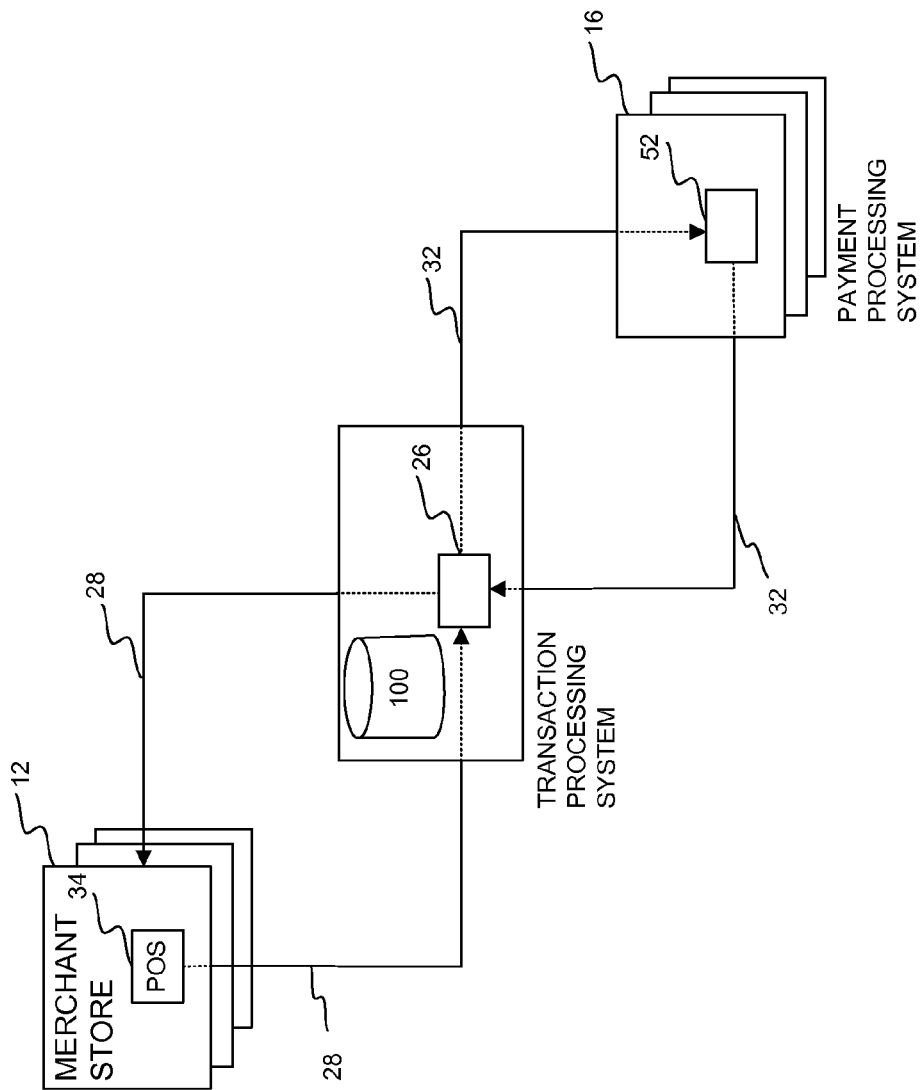
FIG. 3 is a diagram illustrating an improved system for processing transactions, consistent with the present invention.

FIG. 3 is a diagrammatic representation of a system 30 for processing retail non-cash transactions in accordance with an embodiment of the present invention. In FIG. 3, system 30 is comprised of merchant store 12, payment processing system 16 and transaction processing system 26. Located in merchant store 12 is at least one POS device 34 for capturing transaction and customer identification data. Payment processing system 16 utilizes at least one payment processing terminal 52 to process purchase transactions. POS device 34 communicates with transaction processing system 26 over communications link 28 and payment processing terminal 52 communicates with transaction processing system 26 over communications link 32. While this specification describes a system wherein POS device 34 communicates directly with transaction processing system 26, it is understood that POS device 34 may actually communicate with one or more intermediate computers that then communicate with transaction processing system 26, without departing from the spirit and scope of this invention. Communication links 28 and 32 may be secure, dedicated communications links (like links 13 and 15 in FIG. 1) or publicly accessible and unsecured.

Figure 4:
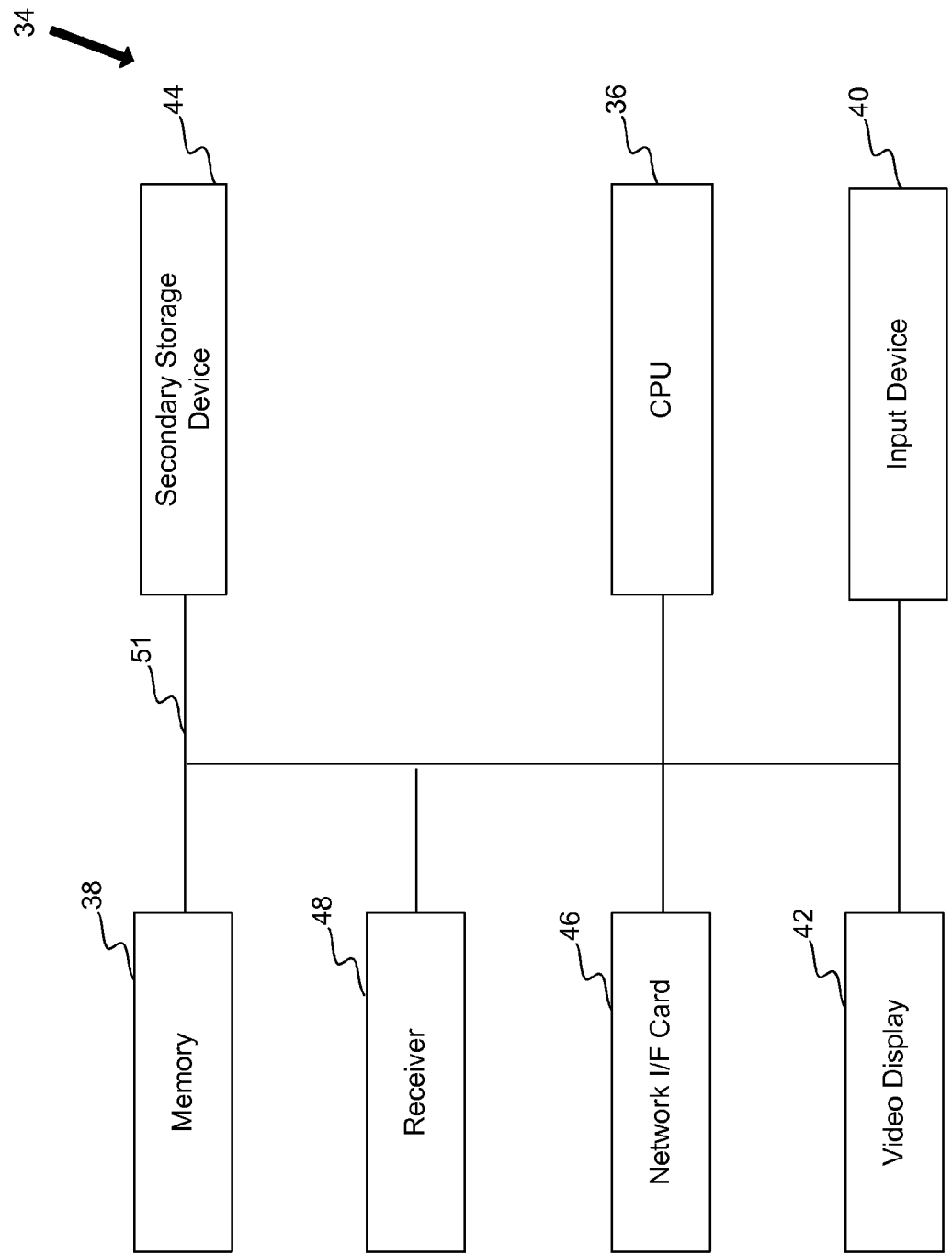
FIG. 4 is a diagrammatic representation of a point of sale device in accordance with the present invention.

A diagrammatic representation of POS device 34 is shown in FIG. 4. POS device 34 is any device used by merchants at the point of sale to record transactions between customers and merchants, including cash registers, point-of-sale terminals, etc. As show, POS device 34 is comprised of a conventional microprocessor 36, a random access memory (RAM) 38, an input device (e.g., keyboard, scanner, etc.) 40, a display or screen device 42, a mass storage 44 (e.g., hard or fixed disk, removable floppy disk, optical disk, magneto-optical disk, or flash memory), a network interface card, modem or controller 46 (e.g., Ethernet), and a merchant transceiver 48. As shown, the various components of each POS device 34 communicate through a system bus 51 or similar architecture. POS device 34 communicates with other POS devices (not shown) and with transaction processing system 26 via network interface card or modem 46. Alternatively, the POS device 34 may be connected via an ISDN adapter and an ISDN line for communications with the transaction processing system 26. Merchant transceiver 48 provides wireless communication with a customer transceiver 50 (explained below) which may be carried by a customer on, for example, his key chain. There may be other components as well, but these are not shown to facilitate description of the unique aspects of this embodiment of the invention. The hardware arrangement of this computer, as well as the other computers discussed in this specification is intentionally shown as general, and is meant to represent a broad variety of architectures, which depend on the particular computer device used. For example, mass storage devices depicted with each computer may be co-located with its associated computing device on an internal storage device or it may be remotely located on an external storage device.

Figure 5:
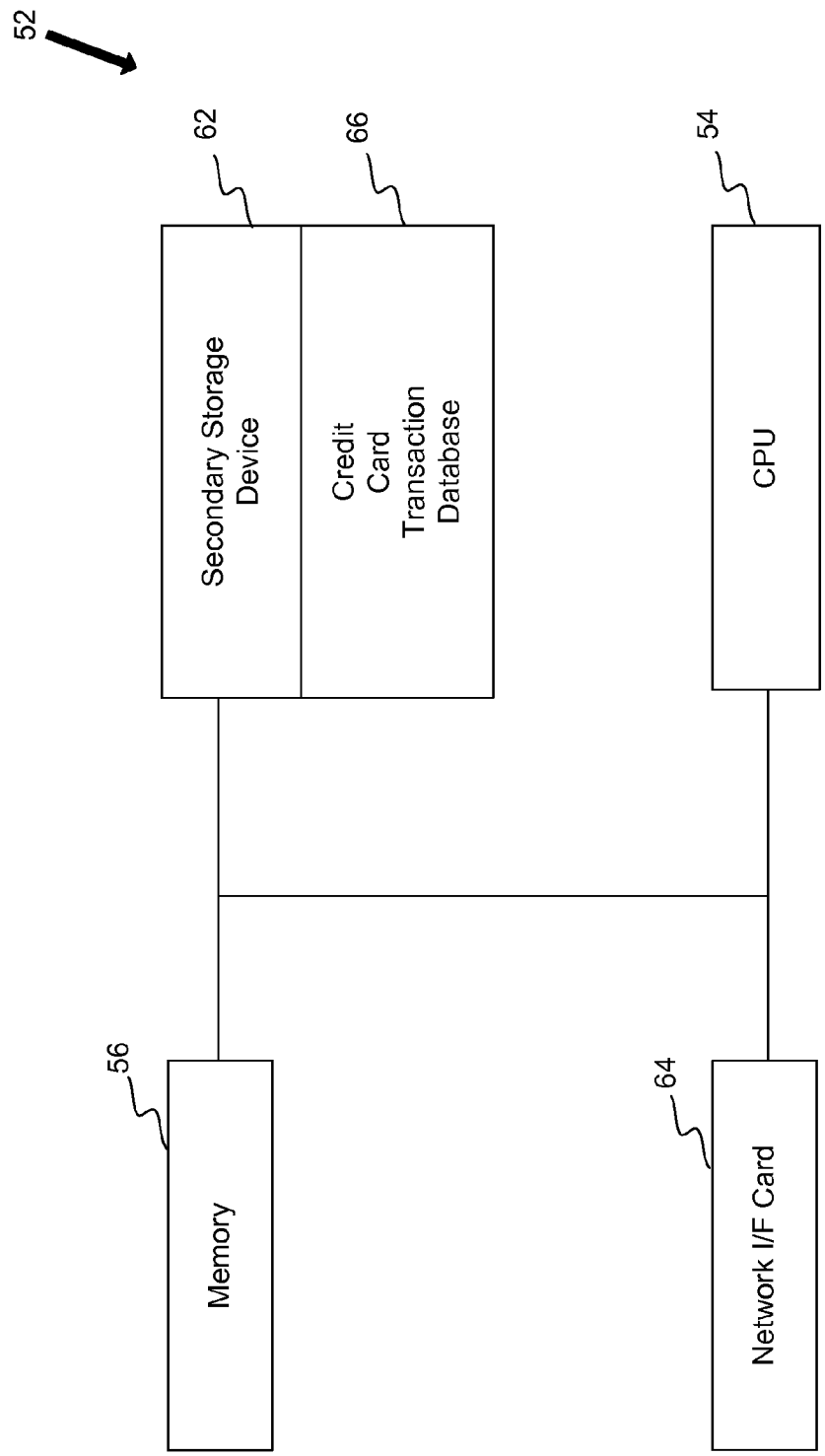
FIG. 5 is a diagrammatic representation of a payment processing terminal in accordance with the present invention.

A diagrammatic representation of payment processing terminal 52 is shown in FIG. 5. Like POS device 34, payment processing terminal 52 is comprised of a CPU 54, RAM 56, a mass storage device 62, and a network interface card or modem 64 for communicating with transaction processing system 26. Stored in mass storage device 62 is a payment database 66 for authorizing payment in response to consumer transactions.

Figure 6:
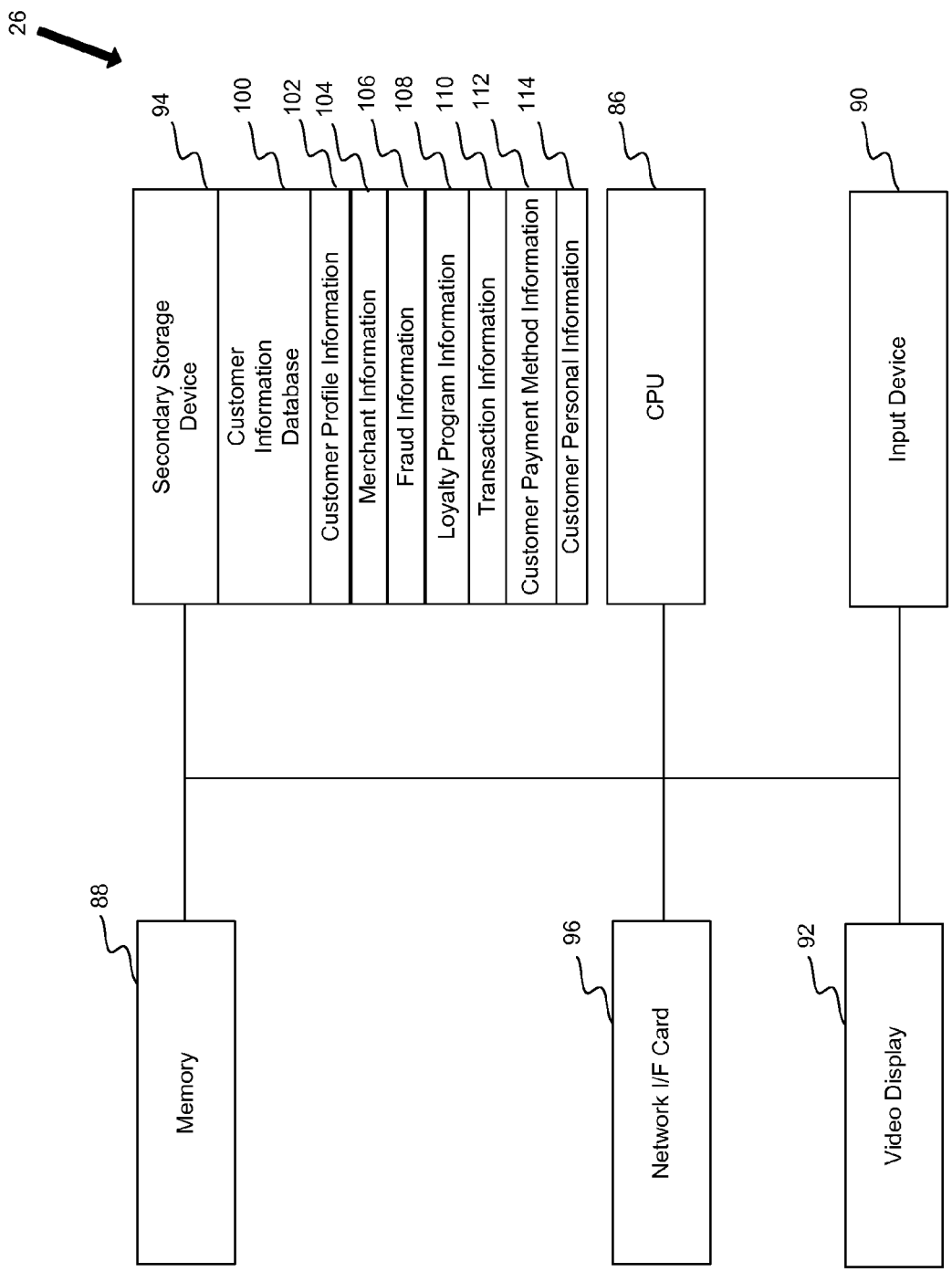
FIG. 6 is a diagrammatic representation of a transaction processing system in accordance with the present invention.

A detailed diagram of transaction processing system 26 is shown in FIG. 6. As shown in FIG. 6, transaction processing system 26 is comprised of a CPU 86, RAM 88, an input device 90, a display or screen device 92, a mass storage device 94, and a network interface card or modem 96 for communicating with POS device 34 and payment processing terminal 52. Stored in mass storage device 94 is a customer information database 100 for identifying a customer, payment method, payment processor, and authorization data format when given a customer/transmitter ID number. The organization of data inside customer information database 100 may take on a variety of physical structures, dependent upon evolving data management technology. Examples include, but are not limited to flat files, relational tables, star tables, hierarchical files, and objects. The data will be organized so that storage and retrieval of customer data facilitates effective navigation, association, and use of customer-related data for identification, transaction authorization, customer contact, identification of customer preferences and other uses of the data consistent with the spirit and scope of this invention. The database is structured to provide maximum security to protect the privacy of customer and merchant information. The ability to relate groups of data such as customer data with specific customer transaction data, for example, will be controlled via the structure of the data storage design as well as through controls of the database system to prevent unauthorized access of detailed and aggregated data by both internal and external sources.

As shown in FIG. 6, customer database 100 may be comprised of the following categories of information: customer profile information 102, merchant information 104, fraud information 106, loyalty program information 108, transaction information 110, customer payment method information 112, and customer personal information 114. Customer profile information 102 identifies and describes each customer. It includes, but is not limited to: customer address data, phone number, date of birth, Social Security number, spending limits (e.g., amount per day, amount per month, etc.), photograph, password, occupation, PIN, billing address, primary account holder name, authorized user name, customer transceiver activation status and customer transceiver identification number. Merchant information 104 identifies and describes each participating merchant. It includes, but is not limited to: merchant name, accepted payment methods with associated authorization procedures (if appropriate), merchant location and merchant identifier. It is important to note that some payment methods (e.g., check, credit and debit) require authorization procedures, while others (e.g., cash, certified check, etc.) do not. Fraud information 106 is used to ensure that customer transceivers 50 are not used by unauthorized users. This information includes, but is not limited to: transmission device identifier, activation status, merchant identifier, merchant location, date of sale, time of sale and sale amount. Loyalty program information 108 defines specific merchant loyalty programs. It includes, but is not limited to: program rules, specific points or other benefits for each merchant loyalty program component. Transaction information 110 includes a listing of the transactions previously conducted by a customer using transaction processing system 26. The information includes, but is not limited to: transaction type, item purchased, merchant, date purchased, price, total price amount, and loyalty program usage. Customer payment method information 112 defines the payment method to be used by each customer at each merchant. Examples include, but is not limited to: default payment method, credit card number, debit card number, bank account number, credit/debit card type, credit/debit card expiration date, name and billing address for credit/debit card, checking account bank name, checking account number, bank routing number, associations between each merchant and each payment method. Customer personal information 114 comprises a plurality of individual customer purchasing preferences and other customer-unique personal information. For example, suppose the merchant is Burger King™. The purchasing information could be the customer's favorite meal or menu item such that whenever the customer initiates a transactions with the merchant, the purchasing preference will automatically be ordered for the customer. Other examples include, but is not limited to: spending limits (e.g., dollar amount per day, amount per year, etc.), whether the customer wishes to always use PIN or only for transactions over a certain dollar amount, customer shoe size, suit size, spouse's birthday, spouse's suit size, etc. Additional information may be stored in customer transaction database 100, and the data may be organized in a different manner, without departing from the scope of the present invention.

Figure 7:
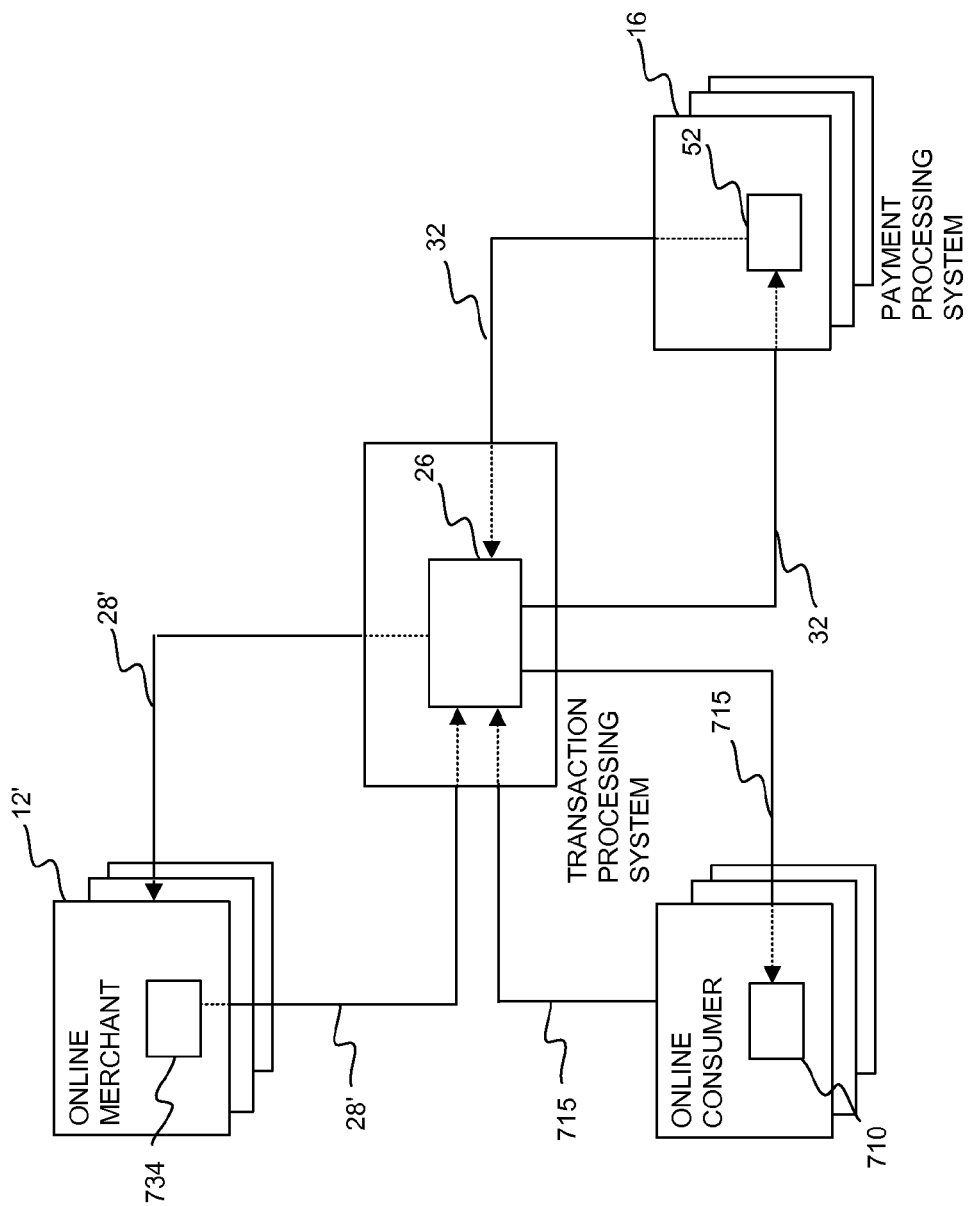
FIG. 7 is a diagrammatic representation of an alternate embodiment of a system for processing transactions in accordance with the present invention.

A second embodiment of the present invention is directed to a method and apparatus for securely processing financial transactions over the Internet or other unsecured network. FIG. 7 is a diagrammatic representation of a system 700 for processing retail, non-cash transactions in accordance with the second embodiment. In addition to the elements shown in FIG. 3, system 700 in FIG. 7 further comprises an online consumer terminal 710 that communicates with transaction processing system 26 over communications link 715. Online merchant 12' replaces merchant store 12, online merchant computer 734 replaces POS device 34, and communication link 28' replaces communications 28 shown in FIG. 3. In this embodiment, communication links 28' and 715 are typically unsecured, publicly accessible links. As in the case of an embodiment, communication links 28', 32 and 715 may be any combination of publicly accessible or secure dedicated links.

The difference between merchant store (FIG. 3) and online merchant 12' is that merchant store 12 is a conventional "brick and mortar" store where consumers can physically select and purchase merchandise, whereas online merchant 12' is a website operated by a merchant that allows online consumers to examine and purchase merchandise over a computer network. Online merchant computer 734 is preferably operated by retail establishments (Macy's, K-mart, Border's, etc.). Its main role is to collect merchandise orders from online consumer terminals 710, and arrange for delivery of the merchandise once it receives authorization from a payment processing system 16.

Figure 8:
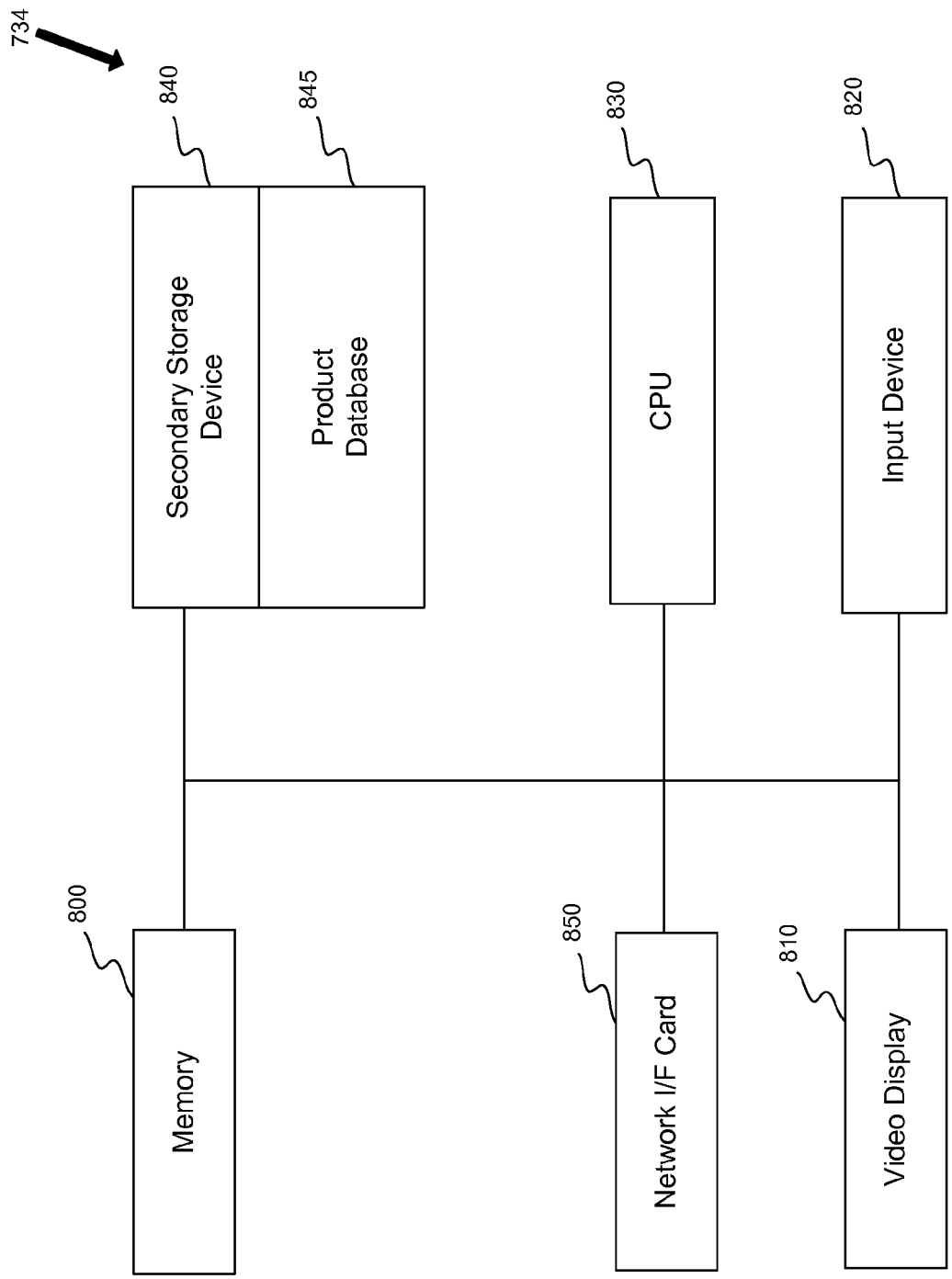
FIG. 8 is a diagrammatic representation of an online merchant computer in accordance with the present invention.

FIG. 8 is a diagrammatic representation of an online merchant computer 734 in accordance with the present invention. As shown in FIG. 8, online merchant computer 734 is comprised of a main memory 800, a display device 810, input device 820, a mass storage device 840, a CPU 830 and a network interface card or modem 850. As further shown in FIG. 8, the mass storage device 840 contains the merchant's product database 845. Product database 845 is comprised of information on various merchant products available online. Once a user accesses a merchant's home page, he/she will be able to access all of the merchant's product pages that are associated with the home page. Individual pages may be sent in the form of Hyper-Text Markup Language (HTML) pages across communication link 715 to a web browser 960 operating on a requesting online consumer computer 710.

Figure 9:
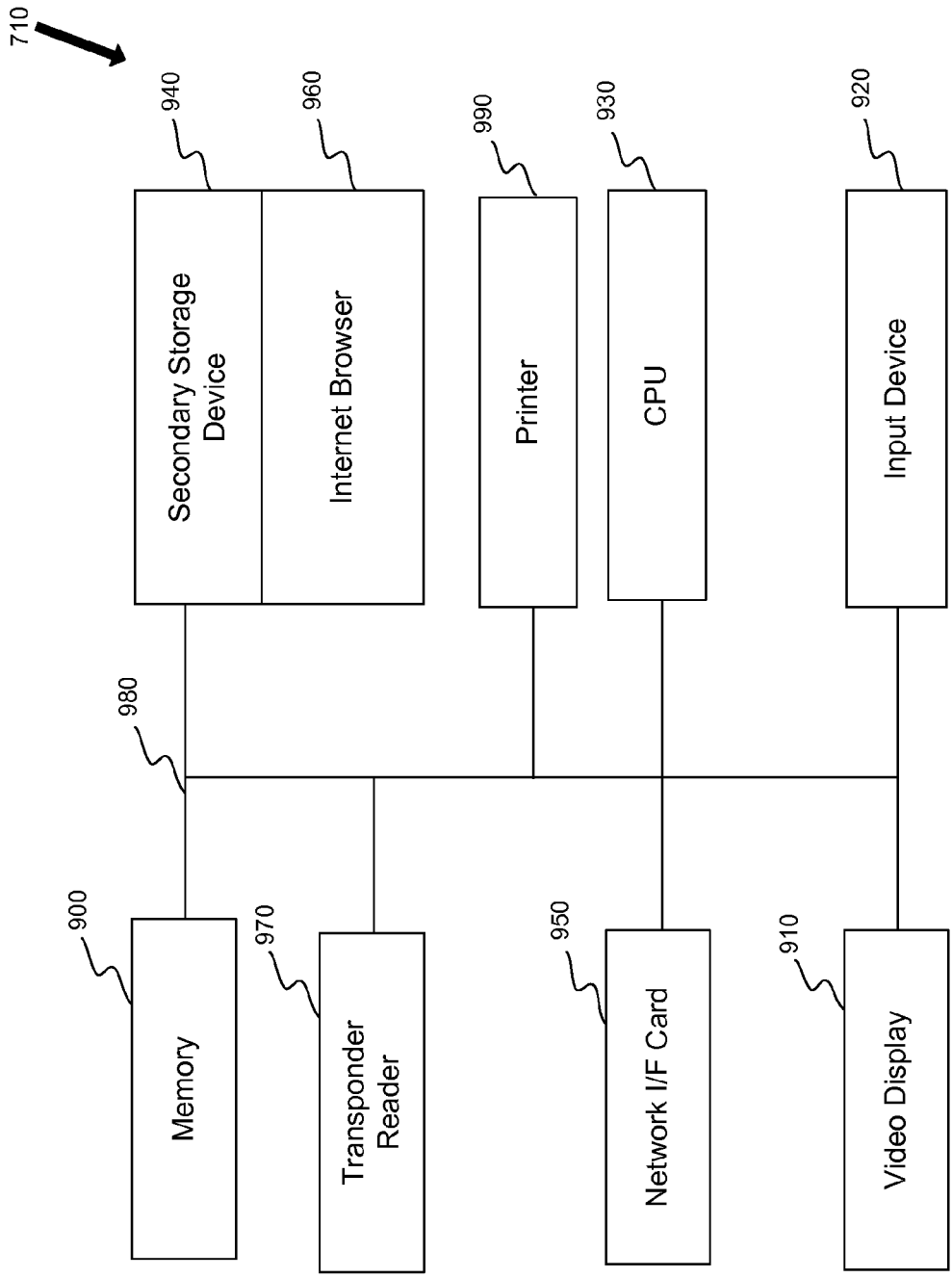
FIG. 9 is a diagrammatic representation of an online customer computer in accordance with the present invention.

As shown in FIG. 9, the online consumer computers 710 preferably include s a main memory 900, display device 910, input device 920 such as a keyboard and a pointing device (e.g., mouse, track ball, pen, slide pointer or similar device), a mass storage device 940, a transceiver 970, a printer 990, and a CPU 930 for performing various functions related to retrieving and viewing webpages stored on the Internet. These components communicate through a system bus 980 or similar architecture. Additionally, the customer computer 710 is preferably connected to a network interface card or modem 950 for communication with the transaction processing system 26. The mass storage device 940 of the customer computer 710 maintains an Internet browser 960 for directing the CPU.

A second embodiment processes transactions very similarly to the first embodiment. That is, an online consumer located at an online consumer computer 710 selects merchandise, identifies it to the online merchant computer 734 and inputs his or her customer/transmitter ID number using a customer transceiver 50 into transceiver 970. The information is transmitted from transceiver 970 via system bus 980 to CPU 930 where it is then transmitted to the online merchant computer 734. Upon receiving the data, the online merchant computer 734 creates an authorization request comprised of the customer ID, a merchant ID and transaction data, and then transmits the data to transaction processing system 26. Transaction processing system 26 then transmits the data to the appropriate payment processing system 16. As in the case of an embodiment, payment processing system 16 authorizes the transaction and then transmits an authorization back to the online merchant computer 734 and online consumer computer 710 via the transaction processing system 26. Once the online merchant computer 734 receives the authorization, merchant's online sales associate prepares the merchandise identified by the customer, and then ships it to the address indicated in the customer information database 100 or any other location specified by the customer. The transaction processing system 26 is capable of managing customer loyalty and consumer trend analysis in the same manner as the first embodiment. In fact, since transaction processing system 26 is capable of interacting with both in-store and on-line systems, it provides participating merchants the ability to comprehensively monitor customer loyalty and consumer purchasing trends for online consumers and in-store consumers using a single system.

A third embodiment of the present invention is directed to a method and apparatus for processing retail non-cash transaction at a kiosk or other similar self-service station. A terminal located at the kiosk is similar to online consumer computer 710 except that a product database similar to that found in online merchant computer 734 is stored in the mass storage device. In operation, the customer in merchant store 12 approaches a kiosk in the store, indicates a food, merchandise or service selection, and provides a customer/transmitter ID using input device 920, customer transceiver 50 or a combination of the two. In doing so, the customer has placed an order for the desired article of food, merchandise or service and simultaneously initiated payment processing. Once the transaction is authorized, a receipt is printed on printer 990 and the purchase is delivered to the customer, either at the kiosk or at another predetermined location. This embodiment provides a combination self-service, automatic payment processing system, with order preparation being the only delay.

In yet another embodiment, a customer may place an order by telephone prior to arriving at merchant store 12, by interfacing with an automated system using DTMF tones through the telephone. That is, when an automated operator at merchant store 12 answers the telephone call, the customer is prompted to enter the customer/transmitter ID number and his/her purchasing preference via the DTMF buttons. Upon arrival, the customer's food, merchandise or service is ready at a drive-through window or inside a special line within merchant store 12. Payment has, at this time, already been processed. The customer uses customer transceiver 50 to identify themselves prior to a sales associate providing the merchandise to the customer. In this example, customer transceiver 50 is simply used to identify that the customer receiving the food, merchandise or services is the customer who corresponds to the customer/transmitter ID previously communicated to the merchant through the DTMF system. Different transactions may be conducted and different information may be exchanged between the merchant and customer to confirm the customer's identification without departing from the scope of the invention. For example, a customer may conduct a transaction over the telephone using a payment method not recognized by the transaction processing system 26, and then take delivery of the merchandise/services after confirming his/her identification using customer transceiver 50 and paying for the items. Customer transceiver 50 may also be used to confirm an individual's identification even in the absence of an underlying transaction. For example, a transceiver 48 may be located adjacent to an airplane loading gate or other restricted access point. A customer seeking to gain access to the restricted area simply provides his identification by interfacing customer transceiver 50 with merchant transceiver 48. This action initiates the security process which may also require an additional form of identification (e.g., picture ID, boarding pass, etc.) to complete. Another embodiment of customer transceiver 50 includes a customer transceiver that identifies a class of persons (e.g., handicapped) such that when a person interfaces with the transaction processing system 26, an attendant will be alerted as to any special customer needs. Yet another embodiment includes a customer transceiver 50 that identifies an individual to a service provider, permitting the service providing to then access information about the customer for the purpose of providing personal services to the customer. A further embodiment includes a customer transceiver 50 that transmits automatic teller machine (ATM) card information to an ATM. Once the ATM receives the information, the customer is prompted to input his/her PIN and transaction information, allowing the process to continue as usual.

Figure 10:
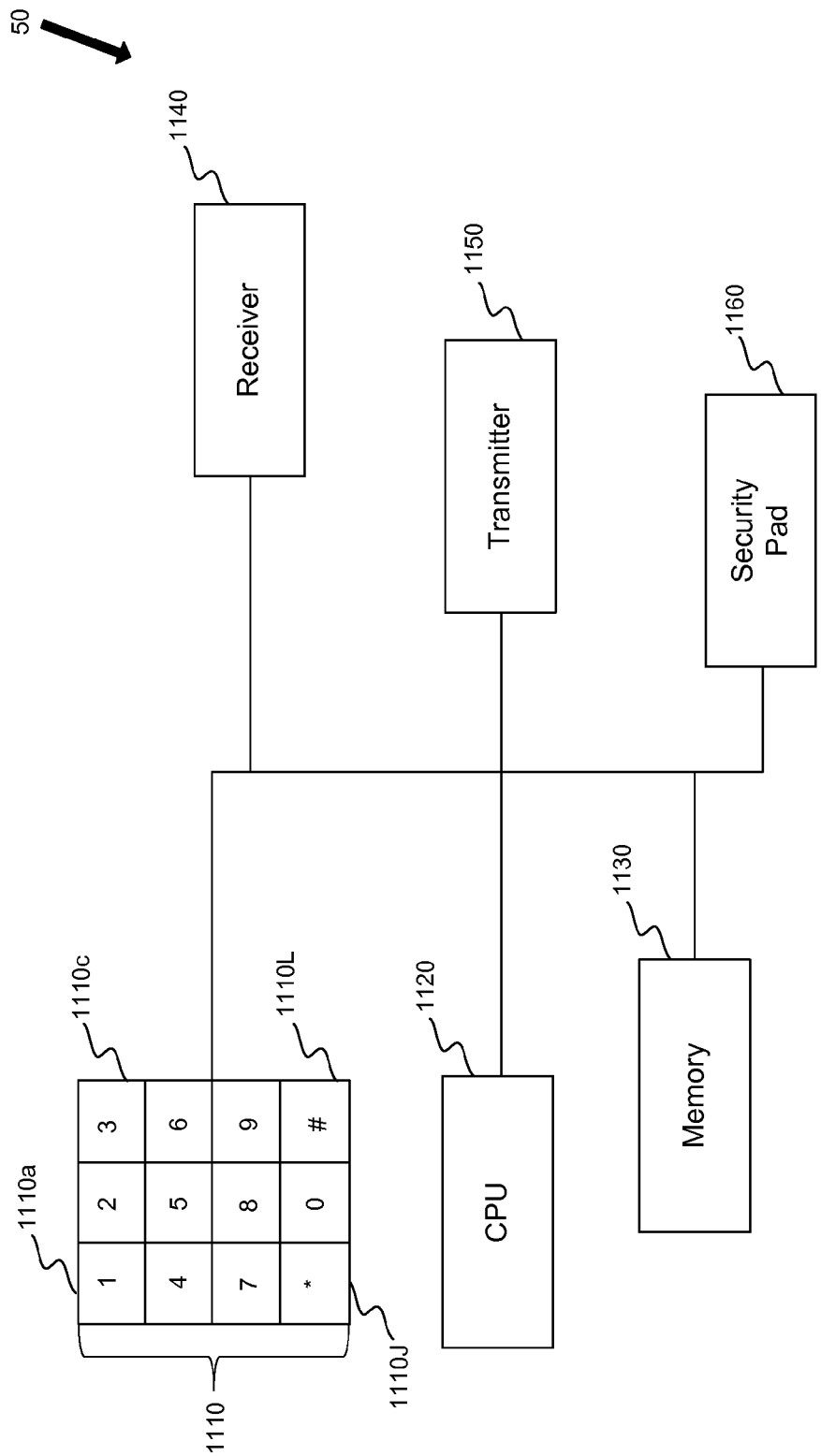
FIG. 10 is a diagrammatic representation of a customer transceiver in accordance with the present invention.

Various active and customer transceivers (48 and 50, respectively) may be implemented in the course of practicing this invention. For example, the TIRIS system commercially available from Texas Instruments Corporation is representative of the technology. Further details of digital signature transponder (DST) and TIRIS technology are contained in U.S. Pat. No. 5,541,604 assigned to Texas Instruments Deutsche Line GmBh, the disclosure of which is hereby expressly incorporated by reference. A simplified diagram of a preferred embodiment of customer transceiver 50 is shown in FIG. 10. As shown, customer transceiver 50 is comprised of keyboard 1110, CPU 1120, memory 1130, receiver 1140, transmitter 1150 and security pad 1160. As further shown in FIG. 10, keyboard 1110 is comprised of a plurality of buttons 1110a-1110l, labeled 0-9, "*", and "#". Each button may correspond to its labeled number/character, or to a selectable user option. For example, button 1110a may correspond to the number "1" such that when a user presses it, the number "1" is communicated to CPU 1120. Button 1110a may alternatively correspond to a user-specified item (e.g., primary credit card, a secondary credit card, or a debit/bank account). In an embodiment, customer transceiver 50 has no independent batter or other power source, such that operational energy is received from transceiver (48 or 970), indicated generally in FIGS. 4 and 11, respectively. Customer transceiver 50 stores identification information such as a customer ID, or customer/transmitter ID in programmable, read-only memory (PROM) device 1130 for subsequent, repeated transmission to a transceiver (48 or 970). Memory device 1130 could optionally be an erasable PROM (EPROM) or random access memory (RAM) device, thereby allowing ease in modifying the contents of the memory device. As previously states, one important characteristic of an embodiment of customer transceiver 50 and merchant transceiver 48 is that operational energy for customer transceiver 50 is transmitted from the transceiver (48 or 970). When customer transceiver 50 is brought within close proximity to transceiver (48 or 970), a signal of a desired frequency passes through receiver 1140, causing it to generate a supply voltage for powering the other components of customer transceiver 50. The signal is received by CPU 1120 which then sends a signal to memory device 1130 and then to customer transceiver 1150 for transmission to an adjacent merchant transceiver 48.

Figure 11A:
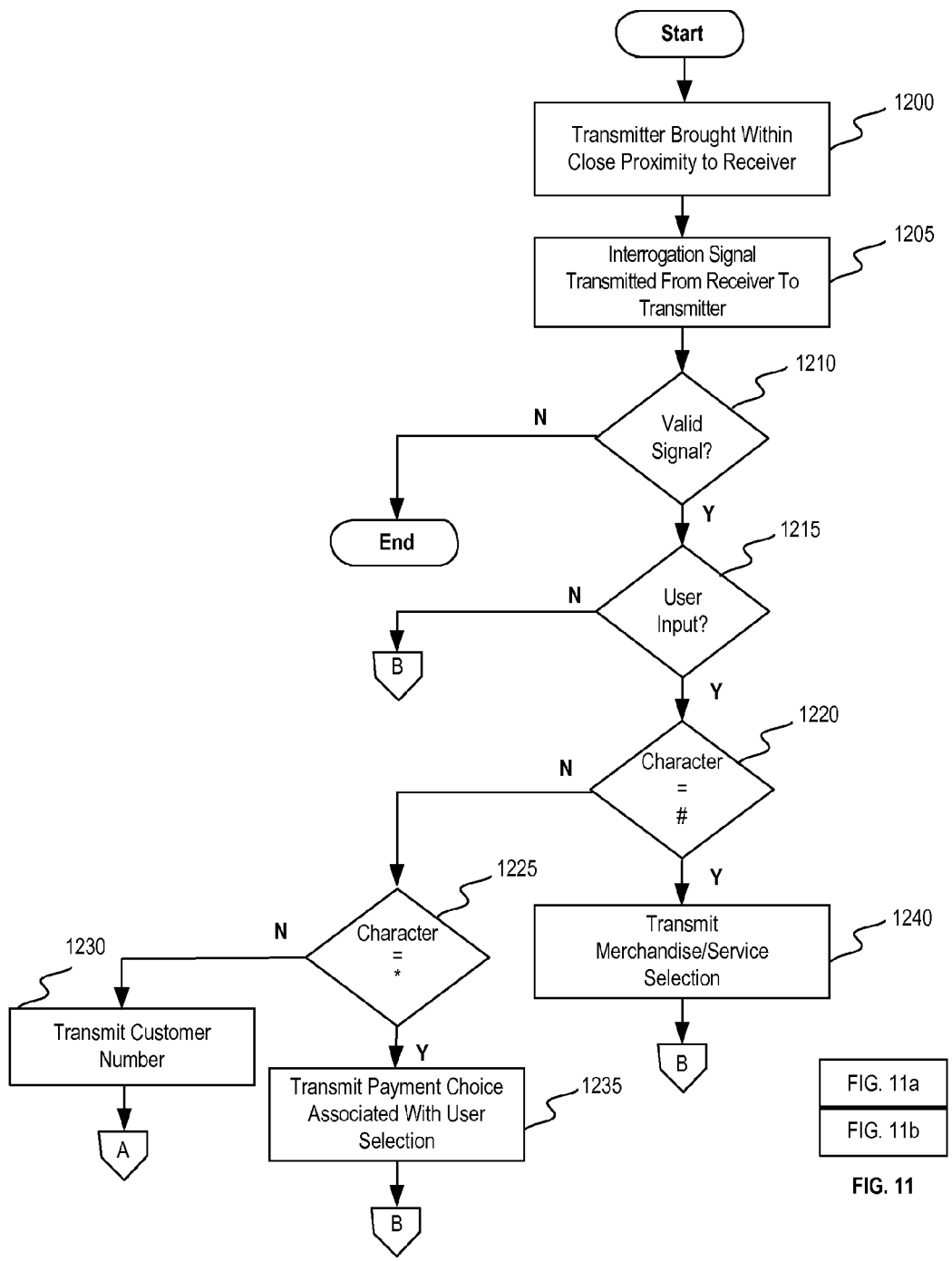
FIG. 11 is a detailed flow diagram depicting the steps performed by the preferred embodiment of a customer transceiver when brought in proximity of a merchant transceiver.
Figure 11B:
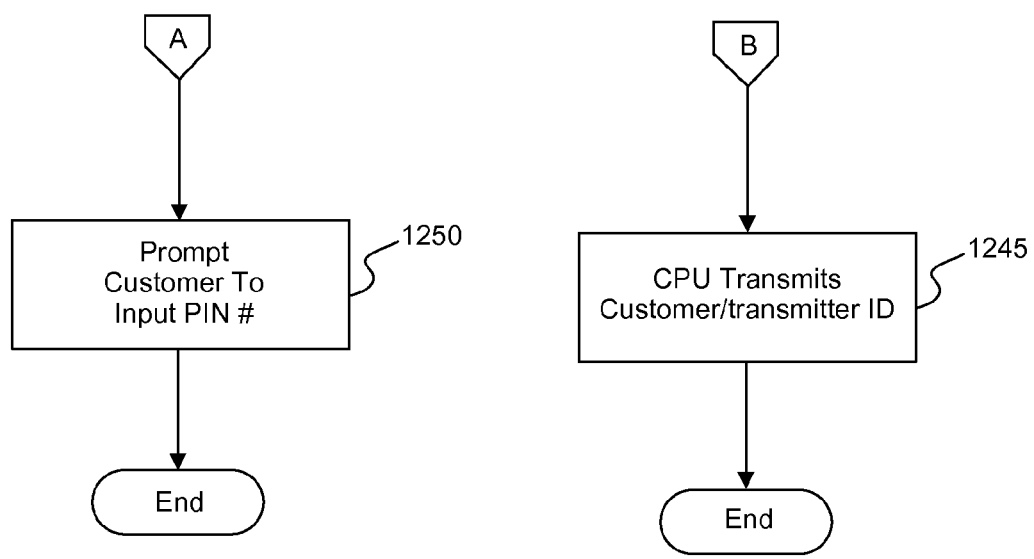

FIG. 11 is a detailed flow diagram depicting the operation of customer transceiver 50. The process begins at step 1200 when the user brings customer transceiver 50 within close proximity to a transceiver (48 or 970). In step 1205, an interrogation signal is transmitted from reader to customer transceiver 50. CPU 1120 processes the interrogation signal with an algorithm which is fixedly programmed into memory 1130 (step 1210). If the signal is valid, processing flows to step 1215, otherwise processing terminated. In step 1215, the CPU waits for user input via keyboard 1110. If the CPU does not receive input, processing flows to step 1245, otherwise processing flows to step 1220, where the CPU determines whether the first character entered is a "#", corresponding to button 1110l. If the first character is a "#", the CPU transmits a purchasing preference associated with the entered number (step 1240). As previously stated, the customer database 100 is capable of storing a plurality of customer purchasing preferences, corresponding to specific items offered by merchant. Pressing "#" prior to pressing a numbered key specifies which order item the customer is interested in selecting. For example, "#1" corresponds to the first purchasing preference, pressing "#2" corresponds to the second, and so on. Processing then flows to step 1245. If the first character is not a "#", the CPU determines whether the first character is a "*", corresponding to button 1110j (step 1225). If the first character is a "*", the CPU 1120 transmits a payment choice selection associated with the entered number (step 1235). The customer must have a valid payment method associated with the entered number, and it must be accepted by the merchant. Otherwise, the process will terminate without authorizing the transaction. After customer information has been entered, processing flows to step 1245 where the CPU 1120 next transmits the stored customer/transmitter ID. If the first character is not a "*", processing flows to step 1230 where the CPU 1120 simply transmits the entered numbers as a customer ID number. That is, the user may actually override the pre-programmed customer ID number and manually input a customer ID number. Processing then flows to step 1250 where the user it prompted to enter a PIN after which processing terminates. When the user manually enters a customer ID number, the system may also require additional authorizing information like a photo ID and/or a signature, to further ensure that customer transceiver 50 is not used in a fraudulent manner. While this specification describes operation of customer transceiver 50 as including the capability to specify a merchandise/service selection, an alternate method of payment, a customer number or a PIN, it is obvious that any data or combination of data may be transmitted by customer transceiver 50 without departing from the spirit and scope of this disclosure.

As shown in FIG. 10, customer transceiver 50 may optionally include a security pad 1160 comprising a fingerprint reader or other biometric recording device. In operation, when a customer transceiver 50 is issued to the customer and prior to its first use, the customer inputs a biometric (fingerprint, palm print, pore print, retinal configuration, etc.) into security pad 1160. For the purposes of this discussion, it is assumed that the biometric is a fingerprint. The first time that customer transceiver 50 is used, the customer fingerprint is read and stored in memory 1130 of customer transceiver 50. When customer transceiver 50 is used for subsequent transactions, it will only activate if the same finger is placed upon security pad 1160, creating a match with fingerprint information stored at the first used of customer transceiver 50. Of course, any finger may be used at initial usage, however, the same finger must then be consistently used on all subsequent transactions. As an alternative, a predetermined number of separate fingerprints may be stored in customer transceiver 50, permitting its use by friends or family members. Initial fingerprints will be read, for example, by depressing one of four predetermined buttons prior to first use of customer transceiver 50. A series of fingerprints is then placed upon the security pad 1160 for storage within memory 1130 of customer transceiver 50. Customer transceiver 50 would then permit subsequent purchases to be made when a fingerprint on pad 82 matches any of the fingerprints prestored within customer transceiver 50. Fingerprint reading, storing and matching technology is currently available from the plurality of sources including, for example, Indicator Technology Corporation, Biometric Identification Inc., and AuthenTec. Even though this specification describes the use of a fingerprint reader, other biometric identification options such as palm prints, pore prints, retinal configurations, etc. may, of course, also be implemented using customer transceiver 50. It should be understood that while this specification describes a security pad associated with customer transceiver 50, the security pad may actually be included in a computer display touch screen.

Another embodiment of customer transceiver 50 includes a customer transceiver with read/write capability. That is, when customer transceiver 50 is used to authorize a transaction, information is passed into memory 1130 from the merchant transceiver 48. For example, a predetermined quantity of money may be stored in memory 1130 such that whenever a transaction is carried out, the amount of the transaction is deducted from the total stored in memory 1130. When the total is exhausted, customer transceiver 50 will not activate until an amount is restored to memory 1130. In another embodiment, a predetermined quantity of money may be stored in a host computer as a component of the customer's user information. Customer transceiver 50 may also track the customer's participation in loyalty programs by updating memory 1130 with purchase data whenever a transaction is authorized. In another preferred embodiment, a purchase transaction is not required to access loyalty program information. Customer transceiver 50 may additionally support remote reprogramming of memory 1130. In other words, a customer wishing to change the customer/transmitter ID associated with customer transceiver 50 may do so by interfacing customer transceiver 50 with merchant transceiver 48 and then modifying the customer/transmitter ID by entering a special code sequence using keyboard 1110, for example. It is envisioned that whenever a customer/transmitter ID is updated by a customer, transaction processing system 26 will disable the subject customer transceiver, pending confirmation of the change. Customer transceiver 50 may alternatively accept customer/transmitter ID updates from transaction processing system 26 via merchant transceiver 48 without user input.

Although the described embodiments employ a customer transceiver carried as a separate item by the customer, customer transceiver 50 may be integrated into another device. For example, customer transceiver 50 may be embedded in a cellular phone, pager, remote control, car lock device, personal digital assistant, watch, MP3 player or other miniature electronic device.

While an embodiment of customer transceiver 50 envisions a device that receives operational energy from a merchant transceiver 48 prior to transmitting an RF signal, it is understood that any device capable of transmitting a signal across a wireless medium (e.g., cellular, microwave, infrared, etc.) may be utilized without departing from the scope of this disclosure.

Figure 12:
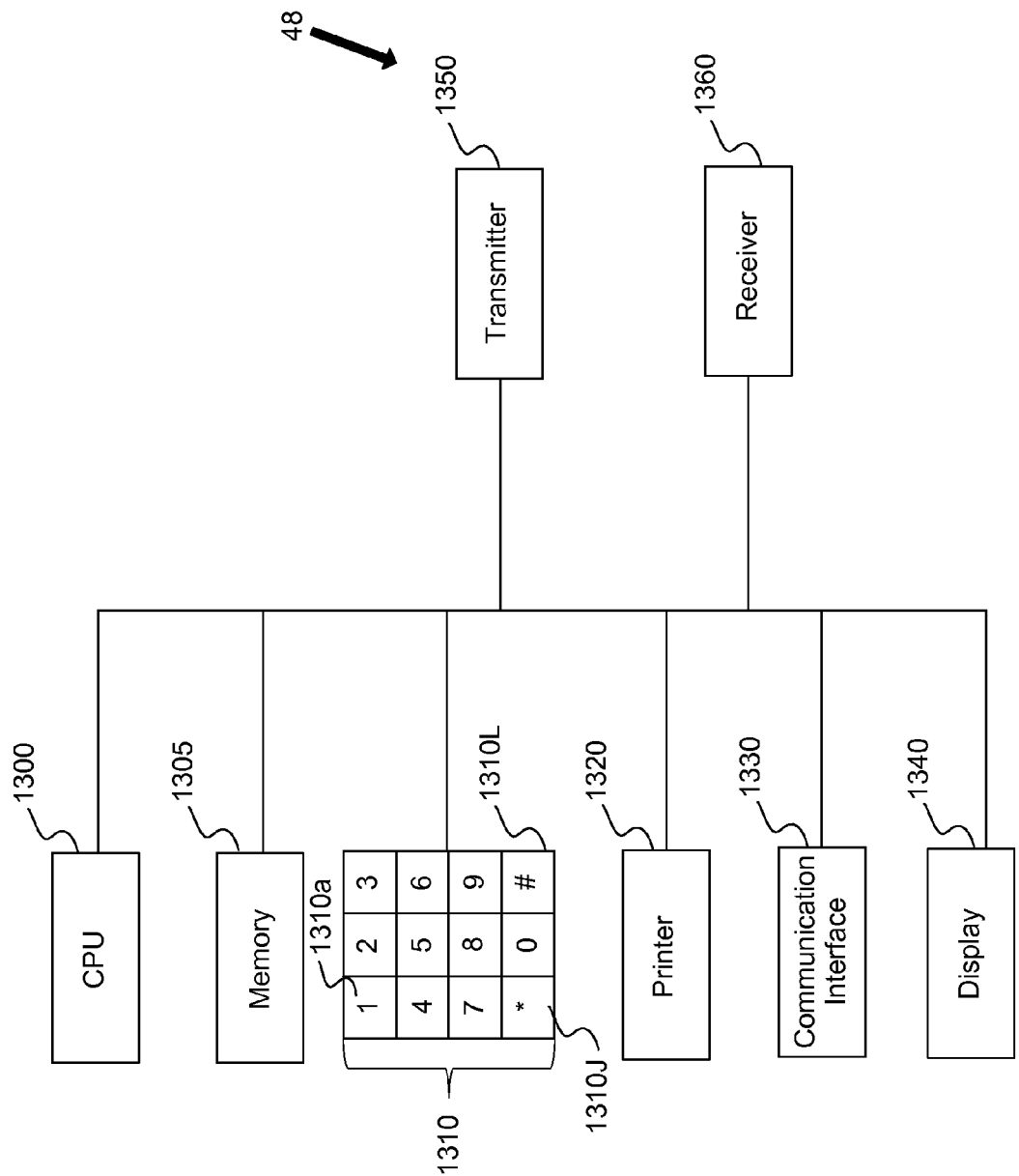
FIG. 12 is a diagrammatic representation of a merchant transceiver in accordance with the present invention.
Figure 14:
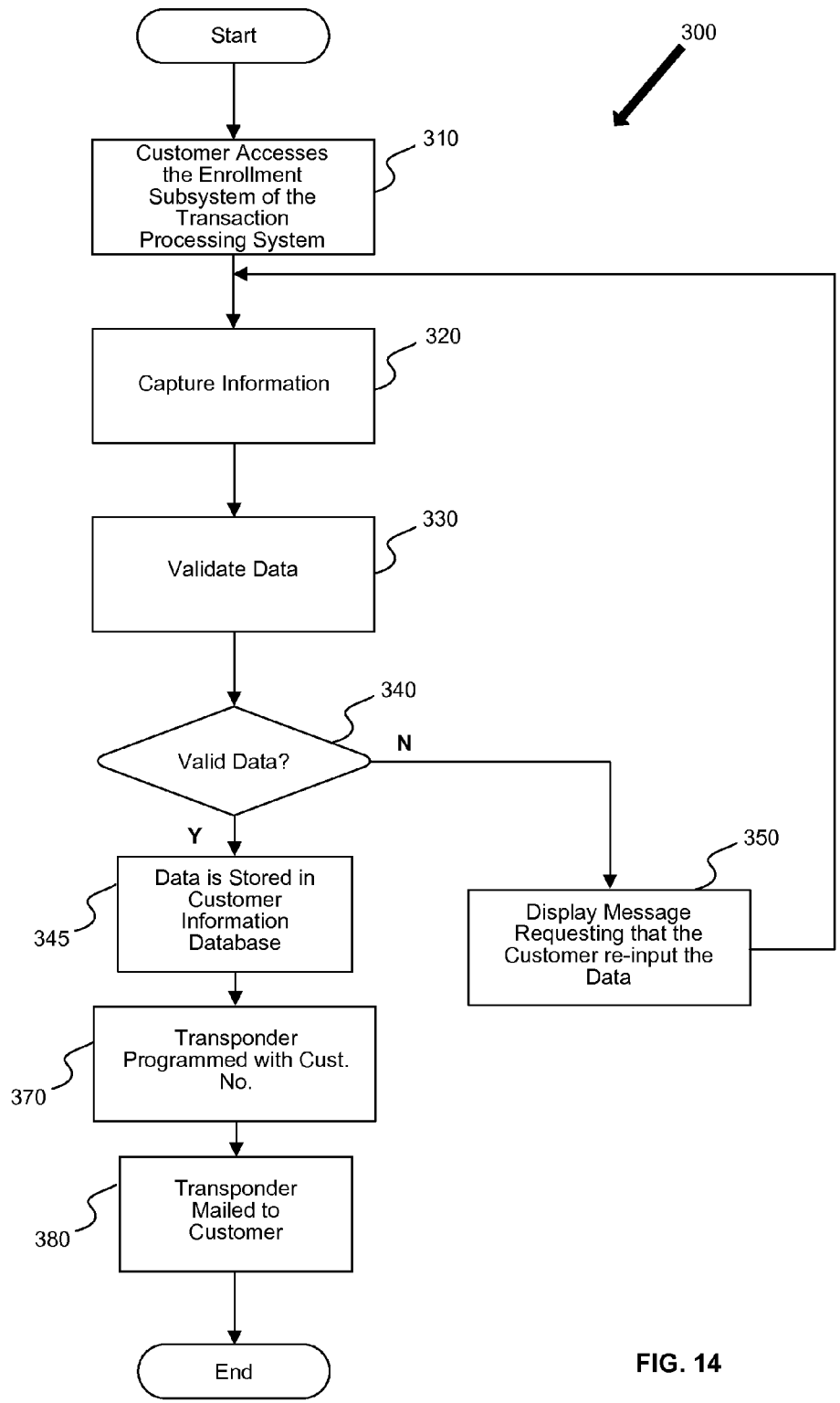
FIG. 14 is a detailed flow diagram depicting the steps performed to enroll a customer in accordance with the present invention.

FIG. 12 shows a detailed diagram of merchant transceiver 48 as previously discussed with reference to FIGS. 4 and 10. As shown in FIG. 12, merchant transceiver 48 is comprised of a CPU 1300, memory 1305, keyboard 1310, printer 1320, communication interface 1330, display 1340, transmitter 1350, and receiver 1360. Keyboard 1310, as further shown in FIG. 14, is comprised of a plurality of buttons 1310a-1310l, labeled 0-9, "*", and "#". Keyboard 1310 may be utilized for receiving manually entered data (e.g., PIN) and transmitting the data to communication interface 1330. In operation, transmitter 1350 transmits an interrogation signal stored in memory 1305 to customer transceiver 50, causing the customer transceiver to generate a sufficient supply voltage for powering the customer transceiver. Receiver 1360 receives a signal from customer transceiver 50 and then transmits the signal to communication interface 1330 for subsequent transmission to an associated POS device 34, online customer computer 710, kiosk, etc. Communication interface 1330 may comprise a wireless or wireline interface, permitting merchant transceiver 48 to communicate with external devices from widely separated locations for the purpose of transmitting information received from a customer transceiver 50 via receiver 1360. Communication interface 1330 further permits merchant transceiver 48 to interface over the Public Switched Telephone Network (PSTN) via an RS232 connection to an internal modem (not shown). Customer transceiver 50 consequently may be capable of interfacing with a central location (over CATV coaxial) cable such that a person wishing to watch a Pay-Per-View™ movie can communicate with the pay-per-view system and purchase the movie directly through the television. Printer 1320 may be used to print a receipt for a customer upon completion of a transaction, and display 1340 may be used to communicate information to a customer (e.g., when to input his/her PIN).

An alternate embodiment merchant transceiver includes a merchant transceiver built into or attachable to a portable device (e.g., Palm Pilot™, hand-held computer, etc.) that enables the capture and transmission of a customer ID and other security information for authenticating payment for goods and services via the Internet, or authenticating and authorizing access to digital information (e.g., movies, music, online books, research) and applications (e.g., voice/mail, personal calendar, "sports entertainment package", golf handicapping program). A further embodiment includes a portable merchant transceiver that allows a vendor (pizza delivery person) to authorize transactions from any location. The merchant transceiver includes a CPU 1300 with sufficient memory 1305 to capture and locally process a transaction. The merchant transceiver may or may not have wireless connectivity to the transaction processing system 26. yet a further embodiment includes a merchant transceiver associated with a vending machine (snacks, cigarettes, stamps, etc.), pay phone, etc. for authorizing consumer transactions.

As discussed above, the preferred embodiment of the merchant transceiver 48 transmits power to, and receives an RF signal from a co-located customer transceiver. However, any device capable of receiving a wireless signal (cellular, microwave, infra-red, etc.) is capable of functioning in the place of the merchant transceiver without departing from the scope of this invention.

In a preferred embodiment, transaction processing system 26 is owned and operated by a company separate from the entities that own merchant store 12 and payment processing system 16. In exchange for the service provided by transaction processing system 26, merchants are charged fees to process transceiver-based transactions. First, a transaction fee is charged for each transaction processed through transaction processing system 26. In addition, an advertising fee may be charged to cover brand communication. That is, customer transceiver 50 is supplied under a brand name owned by the owner of transactions processing system 26. This brand name is widely advertised to entice customers to patronize merchant stores 12 having the ability to conduct transactions using customer transceiver 50. Thus, the owner of transaction processing system 26 charges an advertising fee to participating merchant stores 12.

Alternatively, the transaction processing system 26 may permit large corporations owning multiple retail outlets to market customer transceiver 50 using their brand name. Thus, such merchant companies will "issue" customer transceivers 50 and pay a fee to the transaction processing system. The transaction processing system then offsets these costs to merchant stores 12 by providing monthly rebates based on the dollar volume of transceiver-based transactions conducted through its outlets.

In another embodiment of the present invention, a system and method are provided for interfacing an RF transponder reader carried by a customer, with an RF transponder associated with a merchant's point-of-sale (POS) terminal or a merchant's product. In operation, a customer seeking to purchase retail items or services uses the transponder reader to read the transponder associated with the merchant's POS terminal or the merchant's product. The transponder reader is in communication with the central database. The communication may be wireless. For example, the communication may occur over a wireless telephone network or through a networking protocol such as Bluetooth.

In an embodiment of the present invention, the transponder is associated with a data entry method and/or apparatus. The data entry apparatus may be inserted or built into the transponder unit. Alternatively, the data entry method may be attached to the same device to which the transponder is attached. For example, if the transponder is attached to a keyring, the data entry method may also be attached to the same keyring.

The data entry method of the present invention comprises entering data to be read into a data reader. The data reader comprises means for scanning the data to be read, a power source and memory for storing the read data. The data to be read comprises data associated with a product(s), service(s), or merchant(s). The data to be read may be found in any medium capable of being read by the data reader. For example, the data to be read may be contained in an advertisement. The advertisement may be for a product, service or merchant advertisement. The advertisement may be in a newspaper, magazine, internet website, poster, or similar medium.

The data reader may further comprise means for informing the customer that the data has been successfully read and stored. For example, the data reader may comprise a light, vibration unit, display screen, audible tone(s), audible signal(s), printed receipt, other feedback means, or a combination thereof, that is activated when data is successfully read and stored.

In an embodiment of the present invention, the data to be read is associated with a discount for a product or service. A customer utilizes the data entry method to read the data associated with the discount. The data is stored in association with the transponder. When the customer later purchases the product or service, the customer's transponder is read by the transponder reader associated with the merchant's POS terminal. The data associated with the discount is transmitted to the merchant's POS terminal. The discount is then applied to the customer's purchase transaction of the product.

In another embodiment, when the data associated with the discount is transmitted to the merchant's POS terminal, the data is then matched with corresponding data in a central database or in the merchant's database. This corresponding data informs merchant's clerk and/or the POS terminal to provide the discount. The merchant's database may be an off-site central database, an on-site local database (including an updated database in the POS terminal), or a distributed database. In another embodiment, the data associated with the discount is stored in the customer transceiver. This data is transmitted to the merchant's POS terminal and informs the merchant's clerk and/or the POS terminal to provide the discount. For example, the Universal Product Code (UPC) for a product could be stored in the customer transceiver or data reader memory along with the discount amount associated with the product. The UPC and corresponding discount amount could then be transmitted to merchant's POS terminal.

A discount or offer from a merchant may also be associated with a customer's user profile in a central database or in a merchant's database. As discussed, in an embodiment of the present invention, an authorization request including transaction data is received from a POS terminal by a transaction processing system comprising a customer's user profile or information. The transaction processing system determines from the transaction data is the product or service is covered by the discount or offer associated with the customer's user profile. If the product or service involved in the transaction is covered, the discount or offer is communicated to the POS terminal so that the discount or offer can be applied to the transaction and communicated to the customer and/or merchant's clerk.

In a further embodiment of the present invention, multiple data may be read by the data reader and stored in association with the transponder. For example, data may be read for products from the same manufacturer or distributor. Data may be read for multiple products offered by the same merchant. In a further embodiment, the data to be read may be associated with multiple products offered by a merchant or from a manufacturer. The data to be read may also be associated with multiple products offered by various merchants or manufacturers. For example, a newspaper may contain an insert containing various coupons or discount offers. Data to be read may be associated with all the various coupons or discount offers on the newspaper insert. When a customer uses the data reader to read the data, all the various coupons or discount offers are stored in association with the transponder. Further, the data to be read may be associated with all the various coupons or discount offers in a newspaper section or in the entire newspaper.

When the data to be read is associated with a coupon or discount offer listed on an internet website, the customer may read the data with the data reader as presented on a computer monitor. Further, a customer may transmit the website data to a computer printer. The customer may thereby read the data with the data reader as presented on the printed out hardcopy of the website.

The data to be read may comprise text, graphics, numbers, or patterns, or a combination thereof, that are capable of being read by the data reader. For example, the data to be read may comprise bar codes and the data reader may comprise a bar code reader. The data reader may be capable of reading more than one form of data. For example, the data reader may be capable of reading bar codes, text, graphics, numbers, or patterns, or a combination thereof.

In a further embodiment of the present invention, the data to be read may be associated with a URL address of an internet website. For example, an article in a newspaper may reference an internet website. The internet website may be referenced because it is a topic of the article or because it provides further background or more in-depth information related to the topic of the article. Data to be read corresponding to the referenced internet website may be presented. The data to be read may be at the end of the article, in the article, or in the margin of the article. A customer may read the data with the data reader associated with the customer's transponder. In this embodiment, a transponder reader may be connected to a computer. The computer may have access to the internet. When the customer's transponder is read by the transponder reader connected to the computer, the previously read data associated with the URL address may be transmitted to the transponder reader. The transponder reader may then transmit the URL address to the computer and the computer may access the URL address. The internet website corresponding to the URL address may then be presented to the customer.

In a further embodiment, a coupon or discount offer may also provide a URL address for an internet website where the customer may purchase the product or service associated with the coupon or discount offer. Data to be read may be associated with the coupon or discount and/or the URL address. The customer may read the data with the data reader associated with the customer's transponder. The data may be stored in association with the customer's transponder. The transponder may be read by a transponder reader connected to a computer with access to the internet. The data associated with the URL address is transmitted from the transponder to the transponder reader. The internet website corresponding to the URL address may then be presented to the customer. The customer may purchase the product or service through the internet website and may authorize the purchase with the customer transponder. The data associated with the coupon or discount offer is transmitted from the transponder to the transponder reader. The data is transmitted from the transponder reader to the computer. The computer transmits the data to the internet website. The coupon or discount offer associated with the data may then be applied to the customer's purchase of the product or service.

While the data to be read may be associated with a coupon or discount offer, the data to be read may also be associated with the identification of a product or service. When read and stored, the data may be transmitted to a merchant's transponder reader.

In an embodiment of the present invention, data identifying a product or service is presented to a customer. For example, data identifying a movie video may be presented at the end of a movie review in a newspaper. A customer may read the data with the data reader. The data reader stores the data in association with the transponder. The data may be transmitted to a merchant's transponder reader. For example, a video rental merchant's transponder reader may receive the data stored in association with the customer's transponder which identifies a movie video. The video rental merchant may then provide the customer with the movie video and authorization for the rental transaction may be provided by the transponder.

Alternatively, in the above example, the customer may indicate that he/she does not wish to rent the identified movie video at this particular time. The identified movie video title may be stored in the video rental merchant's database as a "wishlist" item corresponding to the customer's transponder. On a subsequent visit to the video rental merchant, the customer's transponder may be read by the video rental merchant's transponder reader. The customer's "wishlist" corresponding to the customer's transponder may be accessed in the merchant's database and the customer may choose to rent a movie video listed on the customer's "wishlist".

In another embodiment, if the customer indicates that he/she does wish to rent the identified movie video, the merchant's POS terminal communicates with merchant's database or other database to communicate information regarding the identified movie video to the customer. The information communicated may include, but is not limited to: whether the movie is "in stock" or available, when the movie needs to be returned if rented, when the movie will be returned, etc.

In another embodiment, the data to be read may be presented on the product itself. The customer may read the data on the product with the data reader and the data may be stored in association with the transponder. The data may be transmitted to a transponder reader and the product may then be identified to the merchant. Further, the transponder reader may be connected to a customer's personal computer. The data identifying the product may be transmitted to the transponder reader which subsequently transmits the data to the computer. The computer may transmit the data to an internet merchant. The customer may then be presented with an internet website where he/she may purchase the product identified by the data. For example, a customer may scan household items which will soon be used or depleted by the customer. The data corresponding to this shopping list of items is stored in association with the customer's transponder. The data may be transmitted to a merchant or internet merchant and the customer may be given the option to purchase one, some, or all of the items.

Alternatively, the data may be transmitted to a customer's computer printer or to a home personal computer associated with a computer printer. The printer may be used to print a hardcopy shopping list. In a further embodiment, the data may be transmitted to a database which can identify other information that corresponds to the data transmitted by the customer. This information may include the name of the item(s) corresponding to the data, local stores or internet sites upon which the item is available, the store row or product location within a store, item price, etc. This further information or shopping list may also be transmitted to a customer's personal digital assistant. The further information or shopping list may also be transmitted to a kiosk at a local store. For example, this kiosk may be on a shopping cart. The customer may then have access to the shopping list and further information on the shopping cart kiosk.

The transponders utilized by the present invention may be inserted or built into any appropriate device or form factor. In this manner, the transponder may be customized to a customer's lifestyle and preferences. For example, a transponder may be integrated into a smart card with a magnetic stripe. The transponder may be integrated into a soft fabric form. The transponder may also be integrated into devices such as a personal digital assistant, watch, or mobile phone, or covers for same. The transponder may also be integrated into functional forms, such as a money or tie clip, or clothing button or pin. A customer may possess more than one transponder. Different customer profiles or accounts may be associated with each transponder. For example, a customer's profile associated with a transponder in the customer's mobile phone may be different from the customer's profile associated with a transponder in the customer's personal digital assistant. Different customer profiles or accounts may also be associated with a single transponder. The single transponder may have means for a customer to select between the different customer profiles or accounts. The transponder may also have means for a customer to indicate or select between different preferences or indicate a response to a question.

In a further embodiment of the present invention, the transaction authorization further comprises an additional means of validation. The additional means of validation may be any means of identifying the customer as the owner of a transponder. For example, the customer may enter a personal identification number (PIN), biometric data, or a password in combination with use of the transponder. The additional means of validation may be used with every transaction, no transaction, or only for predefined merchants, products, services, transaction types or amounts. This predefined list may be determined by the customer or the merchant. For example, if a transaction is over a predefined purchase amount, additional means of validation may be required for completion of the transaction. In another means of validation, the customer may move the transponder in a predefined manner in front of the transponder reader to provide validation. The movement in the predefined manner is detected by the transponder reader and transmitted to the central database for verification. The predefined manner may be any manual movement which may be suitably reproduced by the customer. The preference information regarding whether a customer should be prompted for additional means of validation may be stored in the customer profile contained in the central database. The preference information regarding whether a customer should be prompted for additional means of validation may also be stored in the transponder itself or in the merchant POS terminal or database.

The central database may also store a customer's purchase profile. Before authorizing a transaction, the central database may analyze the type of purchase for which payment authorization is requested. This analysis may utilize an algorithm to compare the purchase for which payment authorization is requested and the customer's purchase profile. Based upon the analysis, further identification or validation may be requested from the customer; particularly if the analysis shows a likelihood of fraud.

In a further embodiment, the present invention comprises a system for associating a unique ID code, information regarding a person and payment information for a person. In one preferred embodiment, a transponder transmits a unique ID code to a transponder reader. The unique ID code is stored in a central database. Information regarding the user of the transponder is entered into the central database and associated with the unique ID code. Payment information for the user is entered into the central database and associated with the unique ID code. In a further embodiment, the present invention comprises a device for reading a unique ID code from a transponder, reading payment information from a magnetic stripe of a credit card, and associating the unique ID code and the payment information. In a another embodiment, the present invention further comprises means for automatically entering information regarding a person. For example, means for automatically entering the information may comprise optically scanning a person's driver license or reading the magnetic stripe on the back of a driver license.

Further, the device may transmit this information to a central database. In another embodiment, the payment information may be entered by other means not utilizing the magnetic stripe. For example, the payment information may be entered manually using a keyboard or the credit card information may be scanned by an optical reader. In another embodiment, the unique ID code from a transponder may be transmitted to a reader which is then transmitted to a central database. At a later point in time, the transponder user may transmit payment information to be associated with the unique ID code. For example, the user may enter payment information through an internet website for transmission to the central database or the user may enter payment information onto a paper form which is then scanned into the central database. Once payment information is received by the central database, it is associated with the unique ID code corresponding to the user.

In a further embodiment, means for identifying the transponder is located on the outside of the transponder casing or on the packaging containing the transponder unit or otherwise associated with the transponder or on the packaging of or on a device comprising the transponder. The means for identifying may comprise, for example, a bar code or other code capable of being optically scanned. The packaging may comprise shipping or merchandizing packaging. In this embodiment, a central database associates the means for identifying and the unique ID code stored in the transponder. User information is transmitted to the central database. Payment information for the user is transmitted to the central database. The central database associates the means for identifying with the corresponding user information and payment information for the user. For example, a user may present user information and payment information to a merchant. The merchant may or may not utilize a transponder reader. The merchant may scan a bar code on the packaging of a transponder. The merchant transmits the bar code, user information and payment information to a central database. The central database matches the bar code to the corresponding unique ID code associated with the transponder. The central database associates the user information and payment information with the unique ID code corresponding to the bar code. In this manner, the merchant does not need to utilize a transponder reader to enroll a user in the system and method of the present invention.

A customer transponder, transceiver, or user profile may be associated with more than one manner or method of payment. The customer may input preferences or indicate a default payment method to be used depending on transaction type, merchant or purchase amount. The payment methods may include, but are not limited to, at least one of the following: credit card, debit card, ATM card, or bank account.

The customer transponder or transceiver can be associated with two or more different networks or host systems. If a merchant's transceiver reader is presented with a customer transponder that is not currently enrolled or activated for the host network associated with the merchant's reader, then the reader may receive the customer's unique ID code or transmitter code stored in the customer's transponder. The code is transmitted to the merchant's host computer along with the customer's payment and identification information. The customer's identification information may be transmitted electronically derived such as from a magnetic stripe of a credit/debit card or a driver's license. Or the indentification information may be submitted separately. In a preferred embodiment, at least one payment method is transmitted to the host computer with the unique ID for the transponder. The merchant may provide to the customer a paper form to be completed by the customer to provide the name of the customer, address, phone number, credit card number, debit card number, or other payment or customer information. The form may also comprise a preprinted or otherwise applied bar code or other identifying code. This identifying code may be transmitted to the host computer with the unique ID and payment information. When the information from the form is manually entered or optically scanned by a computer, the information may be identified by the identifying code and more efficiently matched with the corresponding unique ID and payment information. All this information may then be stored together in the host computer.

In another embodiment of the present invention, a user's unique ID code stored in the user's transponder may be associated with a second transponder. A customer profile stored in the central database which corresponds to a user's unique ID code may also be associated with a second transponder. The second transponder may be utilized in the system and method of the present invention. Transactions completed with the second transponder may be compiled and presented to the user separate from the transactions completed with the user's transponder. A different form of payment may also be associated with the second transponder than the payment information associated with the user's transponder.

For example, a user may rent a car for use on a business trip. The user presents his/her personal transponder to a rental car agency. The rental car agency associates the user's transponder with a second transponder. The second transponder may also be associated with a customer profile which the user utilizes with the rental car agency. The second transponder may comprise a transponder contained in the key associated with the rental car or a transponder associated with the keyring of the key associated with the rental car. The user may make purchase transactions with the second transponder. The second transponder may utilize the payment information associated with the user's personal transponder or it may utilize different payment information. The permitted uses of the second transponder can be restricted according to the preselections of the user or in the case of business travel, preselections by the business for its employees as communicated to the rental car agency in its stored profiles for the business' employees. For example, the second transponder could utilize a user's personal credit card or it could be associated instead with a user's business expense credit card. When the user returns the rental car to the rental car agency, the user is presented with a receipt. The receipt may contain all transactions made with the second transponder, as well as the car rental transaction. In this example, a user may more easily itemize business expenses at the end of a business trip. In a further embodiment, the second transponder is on the same keyring as the ignition key for the rental car. In an further embodiment, the second transponder or the ignition key is detachable from the keyring. In this manner, when the user provides the ignition key to a third person (e.g., parking attendant, valet, etc.), the third person does not have access to the second transponder.

In a further embodiment of the present invention, the customer transponder may be used to obtain access to a hotel room. In one embodiment, a customer wishing to obtain a hotel room may present his personal transponder to a transponder reader. Authorization for the transaction is obtained using the system and method of the present invention. Upon obtaining authorization, the customer is given the key for a hotel room. The customer may be given the key by a hotel agent, such as a desk clerk. Alternatively, the customer may be given the key automatically by a self-service check-in kiosk containing a transponder reader. In this embodiment, if the room key does not display the room number, the kiosk may print out the room number. The kiosk may also print a receipt for the transaction. In an alternative embodiment, the customer is not given a separate key for a hotel room. Instead, the customer's transponder is associated with a hotel room. The hotel room door contains a transponder reader. The hotel room door transponder reader reads the customer's transponder and unlocks the door accordingly.

In a further embodiment, the present invention comprises a system and method for restaurant transactions. In an embodiment of the present invention, a customer orders food and payment for the food is authorized using the previously described system and method for authorizing transponder transactions. The customer may order the food through a restaurant employee. Alternatively, the customer may select a food order using a self-service kiosk or by pushing buttons on the ordering system normally utilized by employees. In a further embodiment, a customer may order food prior to arriving at the restaurant. The customer may order via automated telephone selection, internet website or other suitable means for ordering food. Upon arriving at the restaurant, the payment for the previously ordered food is authorized using the customer transponder. A customer profile may store a customer's preferred food order. Upon arriving at the restaurant, a customer's transponder is read by a transponder reader. The preferred food order stored in the customer's profile is automatically selected and ordered.

Upon ordering food, a customer may wait at an order counter for delivery of the food. Alternatively, a customer may sit at a dining table. The dining table may have a transponder reader. The customer's transponder is read by the dining table transponder reader. The dining table transponder reader communicates the customer's dining table location to a restaurant employee. The restaurant employee may then deliver the customer's food to the dining table at which the customer is seated. Alternatively, a customer profile may store a customer "will call" name or nickname. This "will call" name or nickname may be communicated to a restaurant employee. Upon hearing the "will call" name or nickname, the customer would know that the food order is prepared and may receive the food at a designated order pick-up site. Alternatively, a preferred food order is stored in a customer's profile. When a customer enters a restaurant, rather than ordering at an order counter, the customer may sit at a dining table. The dining table may have a transponder reader. The customer's transponder is read by the dining table transponder reader. The preferred food order stored in the customer profile and the customer's dining table location are communicated to the restaurant. The customer's preferred food order may be delivered to the customer's dining table location.

In a further embodiment, a customer places a food order prior to arriving at a restaurant. This food order may be made using any suitable means. For example, the food order may be placed through an internet website, a telephone call, mobile telephone call, or mobile telephone internet connection. Upon arriving at the restaurant, the customer parks his/her car in one of a number of designated restaurant parking spaces. A transponder reader is associated with the parking space. The customer's transponder is read by the transponder reader. The transponder reader communicates the customer's parking space location to a restaurant employee. The restaurant employee may deliver the food order to the customer at the customer's parking space. Alternatively, a customer may place an order while at a designated restaurant parking space. For example, when the customer's transponder is read by the transponder reader associated with the restaurant parking space, a preferred food order stored in a customer profile is communicated to the restaurant. The preferred food order is delivered to the customer's parking space.

The aforementioned embodiments specifically involving restaurant ordering and payment have several advantages over current systems and methods. For example, a customer does not need to wait in line to place an order. All customers may order concurrently and simultaneously. Further, in some embodiments, restaurant employees do not have to be trained to take customer orders or even speak the same language as the customer order is automated or performed directly by the customer.

A customer profile may store data regarding customer preferences. This customer profile may be stored in a central database. Customer preferences may include whether a customer wishes to receive a receipt for purchases and what type of receipt the customer wishes to receive. For example, a customer may prefer to receive a receipt after each transaction or for certain transactions over a predefined purchase amount. Alternatively, a customer may prefer not to receive a receipt after each transaction. Instead, a customer may prefer to receive a daily e-mail communication detailing purchases made within the past 24 hours.

In an embodiment of the present invention, loyalty points are accumulated by a customer based on transactions and associated with the customer in a central database. When sufficient loyalty points have been accumulated, a customer may be offered a loyalty award from a merchant. This loyalty award may be a free or reduced price good or service. Alternatively, the loyalty award may be a credit or discount on a future transaction with the merchant. A customer's loyalty award qualification may be communicated to a merchant employee at the customer's next purchase. Alternatively, a customer may receive notification of the loyalty award via e-mail, telephone call or by accessing a customer account on an internet website. The customer may be provided means for identifying the loyalty award qualification to a merchant. For example, a special loyalty award code or coupon may be given to the customer or printed from an e-mail or website. Alternatively, loyalty award qualification may be embedded in the customer's transponder. When the customer's transponder is subsequently read by a merchant transponder reader, the loyalty award qualification is then communicated to the merchant by the transponder reader.

In a further embodiment, the present invention may be used to gain access to a service or event. For example, in this embodiment, a customer may purchase a ticket and the ticket purchase is associated with the customer in a central database. The customer's transponder unique code or other means for identifying the customer's transponder are communicated to the event location. The customer's transponder is read by a transponder reader at the event location. The customer's transponder is recognized as being associated with a customer that has previously paid for a ticket or tickets. A corresponding receipt, ticket stub, or seat assignment may be printed for the customer. However, a receipt, ticket stub, or seat assignment are not necessary as the transponder serves as the identification that the customer has paid for access to the event or service.

In a further embodiment of the present invention, a customer's profile may store preferences regarding certain types of purchases. For example, a customer's profile may only authorize transactions made within a certain geographic area, at a certain type of merchant, for certain types of products, or within a particular transaction price range.

It should be noted that, while many of the above disclosed embodiments and examples of the present invention specify a transponder device, the present invention is not so limited. The present invention does not require a transponder. For example, if a merchant does not utilize a transponder reader, a customer may provide other means for communicating the unique ID code stored in the customer's transponder. This other means may comprise information stored in the customer profile that is unique to the customer. For example, the customer may provide a PIN, biometric data or knowledge specific to the customer. This information may be communicated directly to the central database without allowing access by a merchant agent to the information.

A preferred method for processing a financial transaction will now be described in conjunction with FIGS. 13-17. As described above, the system 10 is operative for capturing a customer's transmitter ID at a POS device 34, combining the captured data with the merchant ID and the customer's selected purchase items into an authorization request, encrypting at least a portion of the request (if desired), and transmitting it to transaction processing system 26. Once it receives the authorization request, the transaction processing system 26 identifies the appropriate payment processing system 16 and then transmits the customer's payment data and the transaction data to the payment processing system 16 for authorization. After the payment processing system 16 authorizes the transaction, it transmits an authorization code back to the merchant via the transaction processing system 26. The transaction processing system 26 may also transmit customer identification and purchase data upon request by a participating merchant. In addition to its function of authorizing retail transactions, transaction processing system 26 also collects the transaction data for later use in compiling consumer purchasing trend data and tracking a consumer's progress in a merchant's loyalty program.

Figure 13:
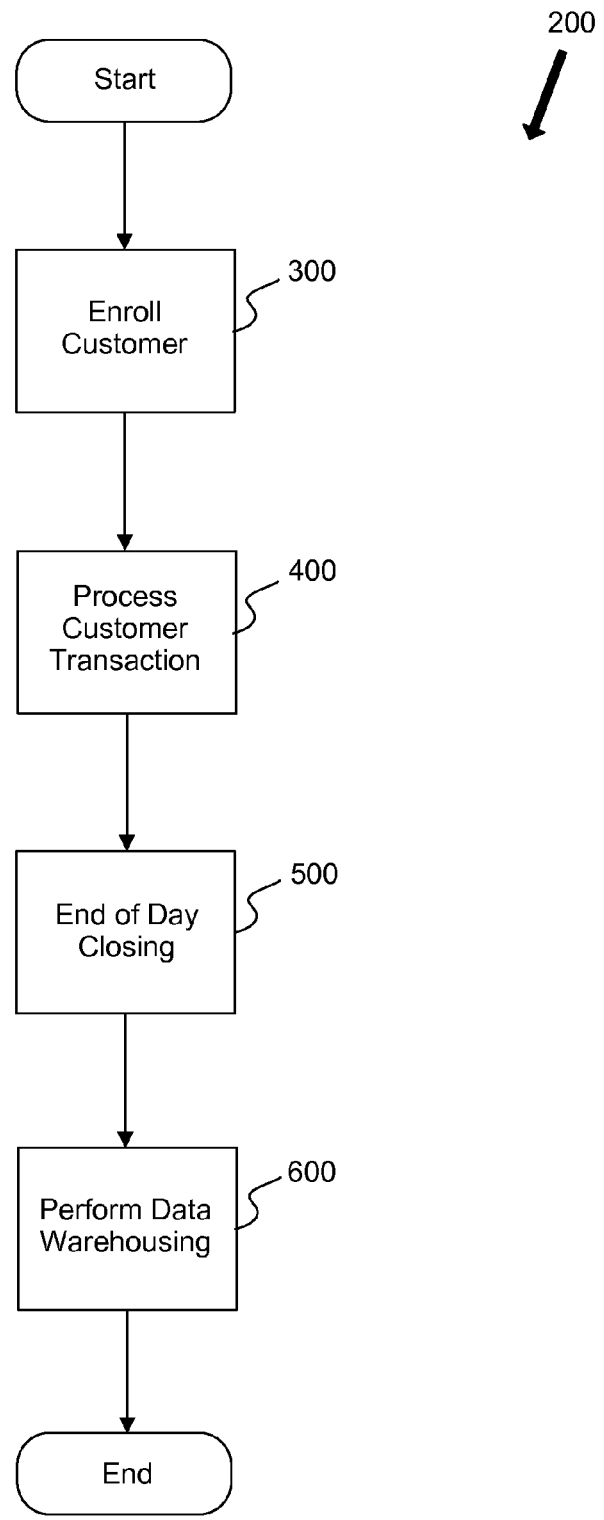
FIG. 13 is a flow diagram illustrating the preferred method for processing financial transactions in accordance with the present invention.

FIG. 13 is a flow diagram illustrating a preferred method 200 for processing financial transactions. The steps that comprise the method described in 200 are carried out by the various equipment that form a part of system 10 for processing financial transactions. The method begins at step 300 with the customer accessing the enrollment subsystem of the transaction processing system 26. This step includes all the activities that must take place before an individual can consummate retail transactions with customer transceiver 50 using transaction processing system 26. After the customer is enrolled, processing flows to step 400 and the system then is capable of processing a customer transaction. At a predetermined time interval, preferably every 24 hours, processing then flows to step 500 where system 10 updates customer preferences and profiles and settles charges for the time period. Next processing flows to step 600 at which time system 10 performs the processing necessary to archive captured data and update loyalty program data.

FIG. 14 is a detailed flow diagram depicting the steps performed by system 10 in step 300 of FIG. 13. As shown in FIG. 14, the process begins in step 310 when a customer accesses the enrollment subsystem of the transaction processing system 26 for the purpose of opening an account. The act of accessing the enrollment subsystem of transaction processing system 26 can be performed any number of ways from simply telephoning a human customer assistance representative and verbally communicating the information over the telephone, to dialing a telephone number and interfacing with a computer using dial tone multi frequency (DTMF) tones, to logging onto the Internet and accessing a predetermined uniform resource locator (URL). Once the customer is logged onto the system, processing flows to step 320 and the enrollment subsystem of transaction processing system 26 prompts the user to enter customer information. During this process, the customer provides customer profile information 102, customer payment method information 112, and customer personal information 114. These data are used for communicating with the customer and may be combined with other data (e.g., transaction information 110, customer personal information 114, etc.) to provide special promotions of particular interest to the customer. During enrollment, the customer also provides the payment methods to be invoked by the transaction processing system 26, whenever he/she initiates a transaction. For example, a customer will provide credit, debit, and other payment-related data so that the customer may be properly charged for purchases. When the customer enters data in the customer transaction database 100, he/she may select any one of the merchant's accepted payment methods in which he/she also has accounts. That is, the customer may choose to have all of his transactions conducted in merchant #1's retail establishments allocated to his VISA™ card even though he has several other cards that are also accepted by merchant #1. Alternatively, the customer may specify that his transceiver-based transactions will be processed and paid through his bank credit or debit card. Furthermore, the customer may specify that all transactions at merchant #1 will be cash transactions, despite the fact that the customer also has credit accounts accepted by merchant #1. The number of merchants associated with each customer record in customer transaction database 100 depends on the number of merchants entered into the system by a particular customer. In other words, customer #1 may have two merchant entries, corresponding to the number of merchants that the customer frequents, whereas customer #2, who is less debt averse may have 20 merchant entries. It is important to realize that certain information must be entered in order for the system to operate properly (e.g., name, address, PIN, etc.), and other information can be entered at the discretion of the customer (e.g., marital status, birth date, etc.). When enrolling, the customer is informed that not only is the input of certain information discretionary, but that they can restrict the publication and use of the information by the transaction processing system 26.

Customers may also identify a default payment method to be applied to a participating merchant for which no other payment method has been identified. This default payment method would also be applied to new merchants that join the transaction processing system 26 after the customer enrolled. Part of the enrollment process includes the customer providing customer personal information such as preferred product brands at different merchants, anniversary and other important dates, clothing sizes, etc. As explained below, all of the data provided by the customer during the enrollment process can be later changed at the customer's discretion. A customer can request more than one customer transceiver 50 to be associated with each account as well as identify other authorized users for each customer transceiver. The rules for use of multiple customer transceivers 50 by multiple individuals are controlled based on the rules of the payment processor 16.

Once the customer has entered the requested information, system 26 validates the payment methods selected by the customer for legitimacy and acceptance. This process is carried out by comparing user-inputted information with data stored in payment processing terminal 52. Once the data is determined to be valid, processing flows to step 345 and the data is stored in customer information database 100. A customer transceiver 50 is programmed with the customer's ID number in step 370, the customer transceiver 50 is mailed to the customer in step 380. Before the customer can use customer transceiver 50 to authorize a transaction, customer transceiver 50 must be activated by the customer. This security process helps ensure legitimate use of the customer transceiver 50 by authorized personnel. In a preferred embodiment, customers activate customer transceiver 50 using identification information provided by them during enrollment and information provided to them in the device package. Once customer transceiver 50 is activated, it can be used by a customer to activate a transaction. If the data is invalid, the system prompts the user to correct the invalid information and processing is routed back to step 320 where the customer is prompted to re-input the invalid information.

Figure 14B:
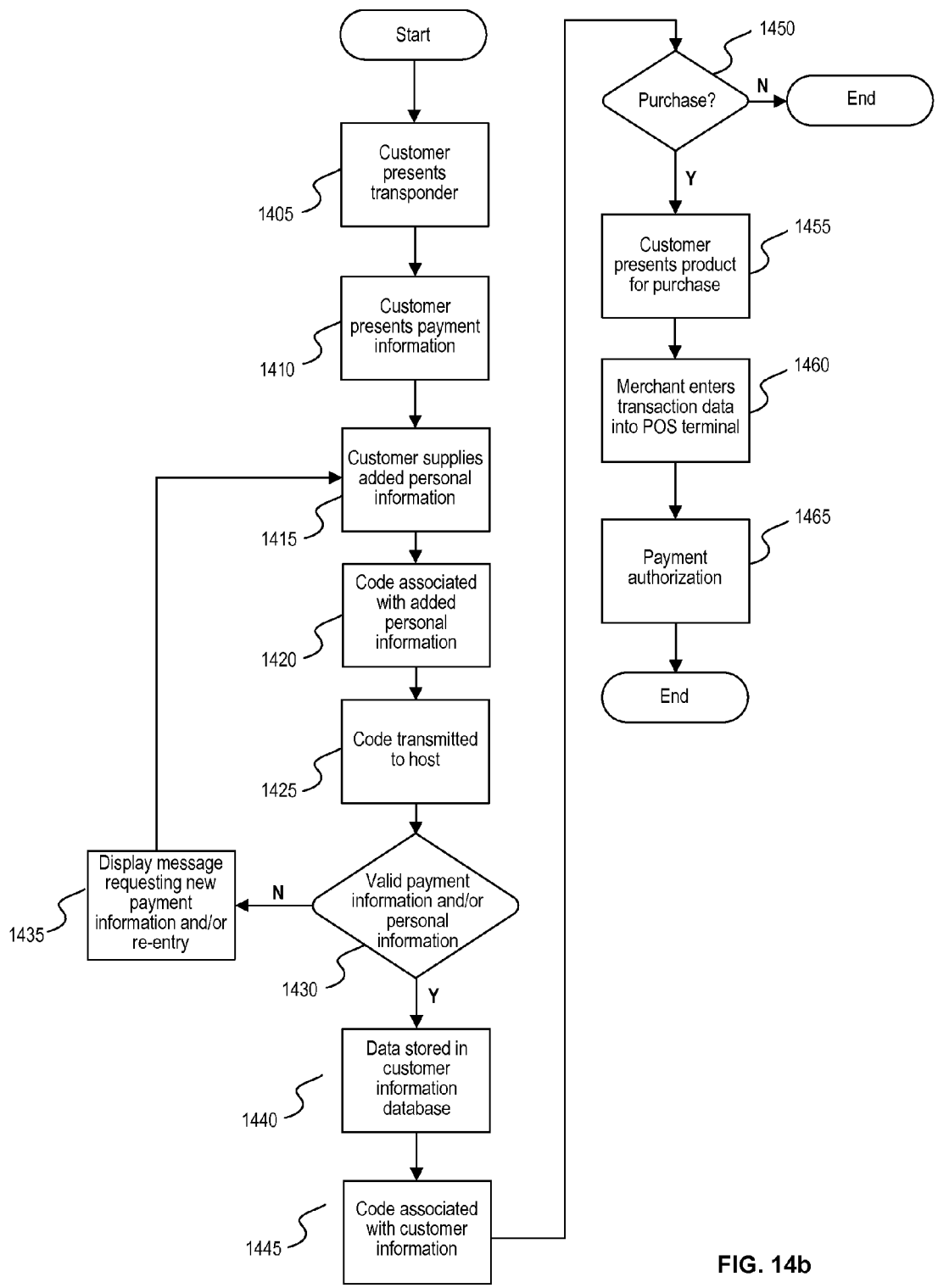
FIG. 14b is a detailed flow diagram depicting the steps performed to enroll a customer in accordance with a further embodiment of the present invention.

FIG. 14b illustrates a further preferred embodiment of step 300 of FIG. 13. As shown in FIG. 14b, the process beings in step 1405 when a customer presents a customer transceiver to a merchant reader or POS terminal. A transmitter ID or code is transmitted from the transceiver to the reader or POS terminal. In step 1410, the customer provides at least one method of payment and additional information corresponding to the at least one method of payment. In step 1415, the customer supplies additional customer identification. This information may include, for example, customer name, account password, PIN, mailing address, email address, daytime telephone number, evening telephone number, date of birth, Social Security number, driver's license number, spending limits, PIN usage preferences, photograph of customer, etc. In step 1420, the transmitter ID is associated with the additional customer identification. In step 1425, this transmitter ID is transmitted to a host transaction processing system or database along with the associated payment and customer information. In step 1430, the host transaction processing system determines whether the payment information supplied by the customer is valid and authorized for purchase transaction. If any payment information is invalid or not authorized for purchase transactions, the process flows to step 1435 and the customer is requested to provide further or corrected payment information. If the payment information is valid, then the process flows to step 1440. In steps 1440 and 1450, the payment and customer information is stored in association with the transmitter ID in a database utilized by the transaction processing system. The process may include merchant validation of the additional customer information (e.g., by comparing a photographic identification on a driver's license with the presenting customer).

The process may continue, as shown in step 1450, the customer wishes to then make a purchase with the newly enrolled customer transceiver. If the customer does not want to make a purchase, the process terminates. If the customer wishes to make a purchase, the process flows to step 1455. In step 1455, the customer presents the product or service desired for purchase. In step 1460, the merchant enters the transaction data for the product or service into merchant's POS terminal. In step 1465, an authorization request is transmitted to the transaction processing system by the POS terminal. The customer does not have to re-present the customer transponder to the POS terminal as the transmitter ID is already registered with the POS terminal from the enrollment process. From step 1465, the authorization request follows the methods and processes disclosed and discussed elsewhere in this specification.

Figure 15B:
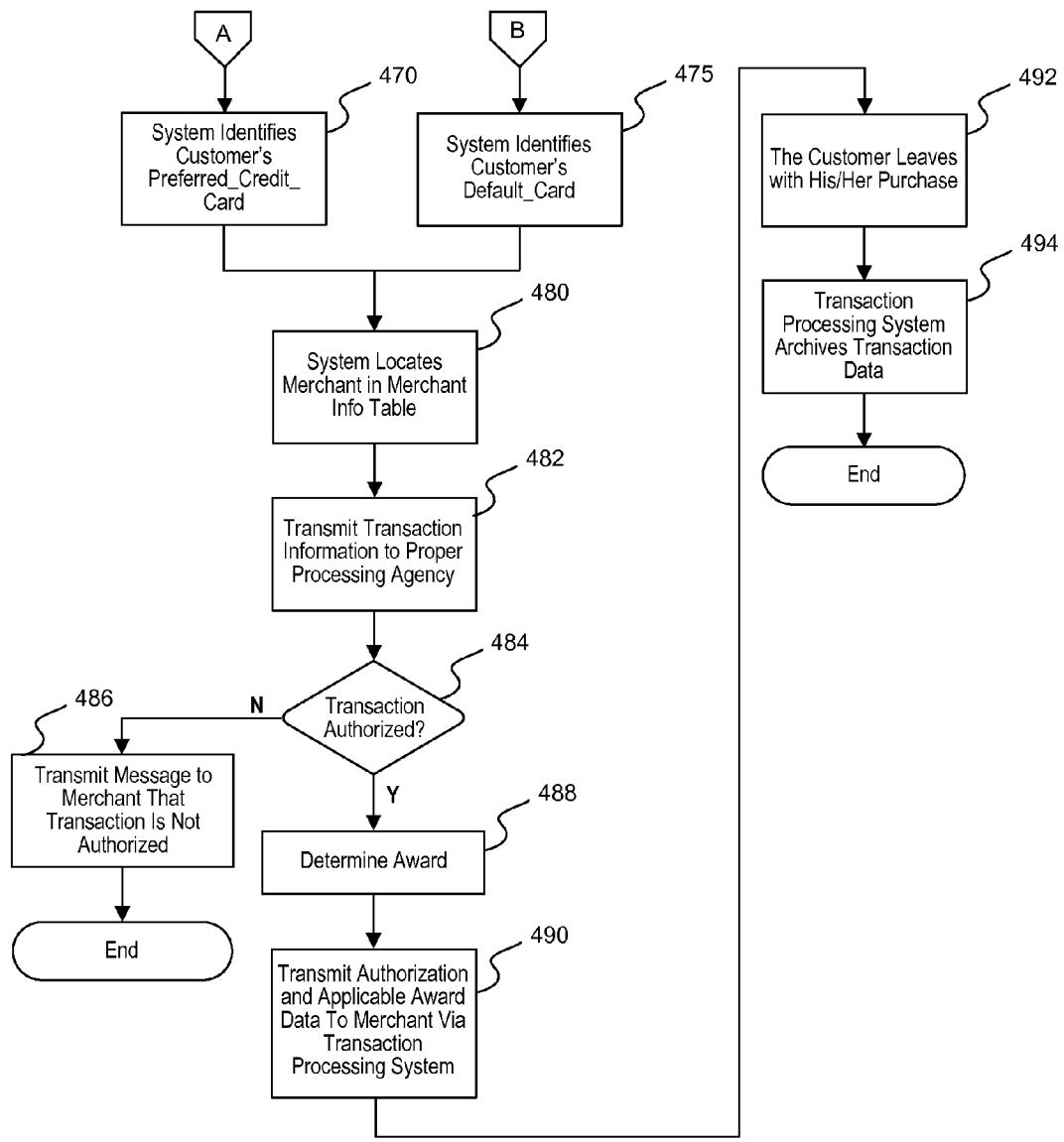
FIG. 15 is a detailed flow diagram depicting the steps performed to process a customer transaction in accordance with the present invention.

FIG. 15 is a detailed flow diagram depicting the steps performed in step 400 of FIG. 13. As shown in step 410, the first step occurs when a customer shopping in merchant store 12 identifies merchandise for purchase to a sales associate. Next in step 415, the sales associate utilizes input device 40 of POS device 34 to enter the merchandise into CPU 36 which then computes a transaction amount. After reviewing the transaction record, the customer in step 420 identifies him/herself to system 26 by interfacing customer transceiver 50 with merchant transceiver 48. Customer transceiver 50 consists of an electronic transmitter/receiver combination including a unique customer/transmitter ID number programmed therein. When customer transceiver 50 interfaces with merchant transceiver 48, a customer identification signal including the unique customer/transmitter ID number is transmitted to merchant transceiver 48. To provide security, merchant transceiver 48 and customer transceiver 50 employ technology in which an interrogation signal is transmitted from merchant transceiver 48 to customer transceiver 50. customer transceiver 50 processes the interrogation signal with an algorithm which is fixedly programmed into customer transceiver 50 and then transmits a response back to merchant transceiver 48, consisting of a customer/transmitter ID number. The interrogation signal and the response signal are highly encrypted such that intense processing power over a long period of time will be necessary to fraudulently extract the unique customer/transmitter ID number from the customer transceiver 50.

Once merchant transceiver 48 receives the customer/transmitter ID number, it transmits the data, together with the specifics of the retail transaction (cost, identification of merchandise, etc.) over communications link 28 to transaction processing system 26 (step 425). An important feature of system 10 is that the customer's credit card is never exchanged with a sales associate. Therefore, the possibility that the card will be fraudulently used by an unscrupulous sales associate does not arise.

An alternate embodiment of the present invention includes a system 26 that instead of transmitting a customer's credit card number across communication links (FIGS. 3 and 9), only transmits a customer/transmitter ID across communication links. In this embodiment, payment processor 16 maintains data that provides a correlation between customer/transmitter ID numbers and payment methods. Also, merchant store 12 creates a transaction record based using the customer/transmitter ID number instead of the credit/debit card number. In operation, when an authorization request is transmitted to transaction processing system 26 from a merchant store 12, transaction processing system 26 processes transactions by matching the customer/transmitter ID number with data stored in customer information database 100. After the system identifies the customer ID (step 435), it links it to the customer's name (step 445) and then to the transaction information (step 450). If the system does not find the customer ID in step 435, it transmits a message to the merchant informing it that the customer is attempting to utilize an invalid customer transceiver (step 440). If the system finds the customer ID in step 435, it may simultaneously authorize the retail transaction, pending final authorization by the payment processor 16. That is, at the same time as the rest of the authentication process is occurring, the system may authorize the initiation of delivery of the desired goods services. For example, during an automobile refueling process, the system will activate a fuel pump, minimizing the customer's delay even though final approval has not yet been obtained. If in step 460, the system finds the merchant's name, it identifies the customer's payment method for that particular merchant (step 470) and determines the flow and destination of the authorization data, based on the type of transaction (credit, debit, cash, etc.). Security information may also be utilized by the transaction processing system 26 to reduce misuse of customer transceiver 50. Examples of controls include but are not limited to checking the frequency of use of a particular customer transceiver 50 within a certain period of time, frequency of use a customer transceiver 50 within certain financial limits and frequency of use of customer transceiver 50 and financial limits within a specific geographic region.

In the event that the transaction requires authorization, such as in a credit card transaction, the merchant POS device 34 communicates with transactions processing system 26 as described above to identify the correct payment processor 16 and transmit the transaction request to that payment processor for disposition. If the transaction is authorized in step 484, the system next in step 488 determines whether the customer is entitled to any frequent customer, or loyalty awards by comparing the customer's transaction activity stored in transaction information 110 with the loyalty program information 108. The authorization and the award data (if any) are transmitted to the merchant via the transaction processing system 26 (step 490) and in step 492, the customer is given his merchandise or services and notified of his/her award. In step 494 the transaction processing system 26 archives the transaction data in secondary storage device 94 for later analysis. If for some reason the payment processing system 16 is not able to process this particular transaction due to, for example, communication's difficulties or a transaction amount causing the customer to exceed his credit limit, a message is transmitted to the merchant via the transaction processing system 26 in step 486 that the transaction is not authorized and the in-progress delivery of merchandise (e.g., gasoline) is immediately discontinued. The sales associate is then notified in a well-known manner to ask the customer for an alternative method of payment and processing terminates. While this specification provides that the transaction terminates when the payment method cannot be authorized, there are several other alternatives that can be implemented without departing from the scope of the present invention. For example, if the payment method does not work, it is possible that an alternate could be requested by the system and utilized.

If the transaction does not require authorization (i.e., cash or other liquid asset is used), POS device 34 still communicates with transaction processing system 26 to provide transaction information 110 and loyalty program information 108 to customer information database 100 and to determine whether the customer is entitled to a loyalty award.

A customer may also utilize transaction processing system 26 to conduct inquiries into the customer's progress toward fulfilling the requirements of a particular loyalty program. To initiate the request, the customer accesses the transaction processing system 26 as mentioned above (i.e., by telephoning a human customer assistance representative and verbally communicating the request over the telephone, or dialing a telephone number and interfacing with a computer using DTMF tones, or logging onto the Internet and accessing a predetermined URL), and then communicating his/her request.

Figure 16:
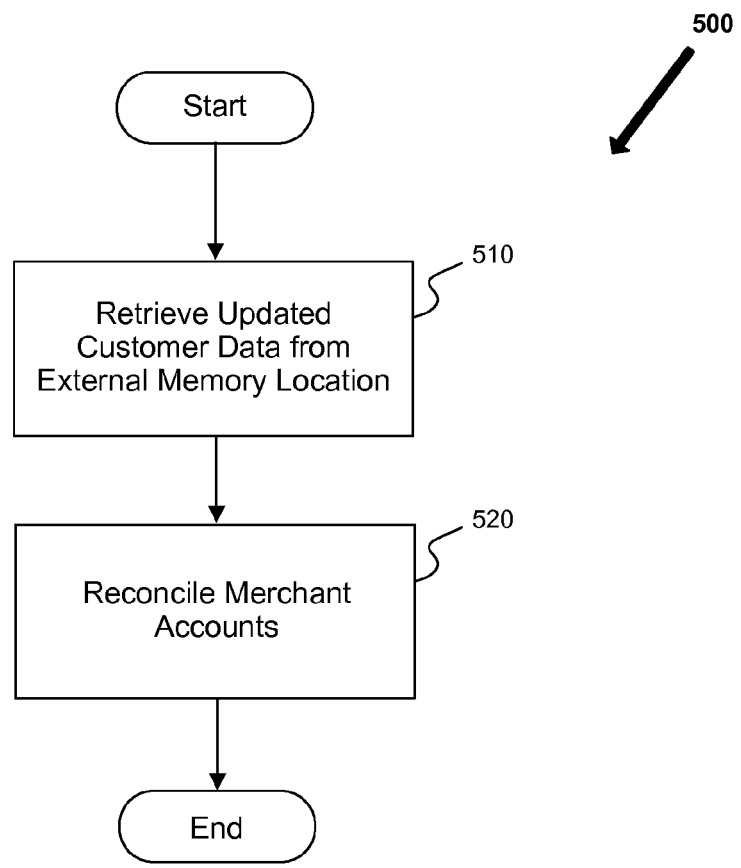
FIG. 16 is a detailed flow diagram depicting the steps performed to perform an end of day closing in accordance with the present invention.

FIG. 16 is a detailed flow diagram depicting the steps performed in step 500 of FIG. 13. In a preferred embodiment, customers can update information contained in the customer information database 100 by following the same process utilized when the information is first communicated to the system. The reason for the update can range anywhere from changed circumstances (customer address, status change, etc.) to changing preferences with respect to specific merchants to adding new merchants for customer. Data security controls are utilized to ensured that only legitimate customers can access and modify their profile data. To preclude customer updates from interfering with the operation of the system, it is envisioned that transaction processing system 26 will update customer information database 100 at predetermined times during the day, preferably during off-peak usage times. As shown in step 510, transaction processing system 26 periodically retrieves updated customer profile data from an online memory location (RAM 88, or secondary storage device 94). In step 520, the transaction processing system 26 reconciles merchant accounts. That is, the system aggregates merchant sales, credits merchants and payment processors when appropriate and then presents invoices to each merchant and payment processor, based on sales activities. Customer profile information 102, merchant information 104, transaction information 110, and customer payment method information 112 are used to determine the fees to be paid to each entity (merchant store 12 and payment processor 16, and transaction processing system 26, as appropriate.). Once the information is aggregated, the transaction processing system 26 updates customer profile data (step 530).

The process depicted in FIG. 16 does not include the process performed when a user seeks to have his/her transponder activated due to it being lost or stolen. In this case, the database will be immediately updated in order to preclude fraudulent use of the transponder by unauthorized personnel.

Figure 17:
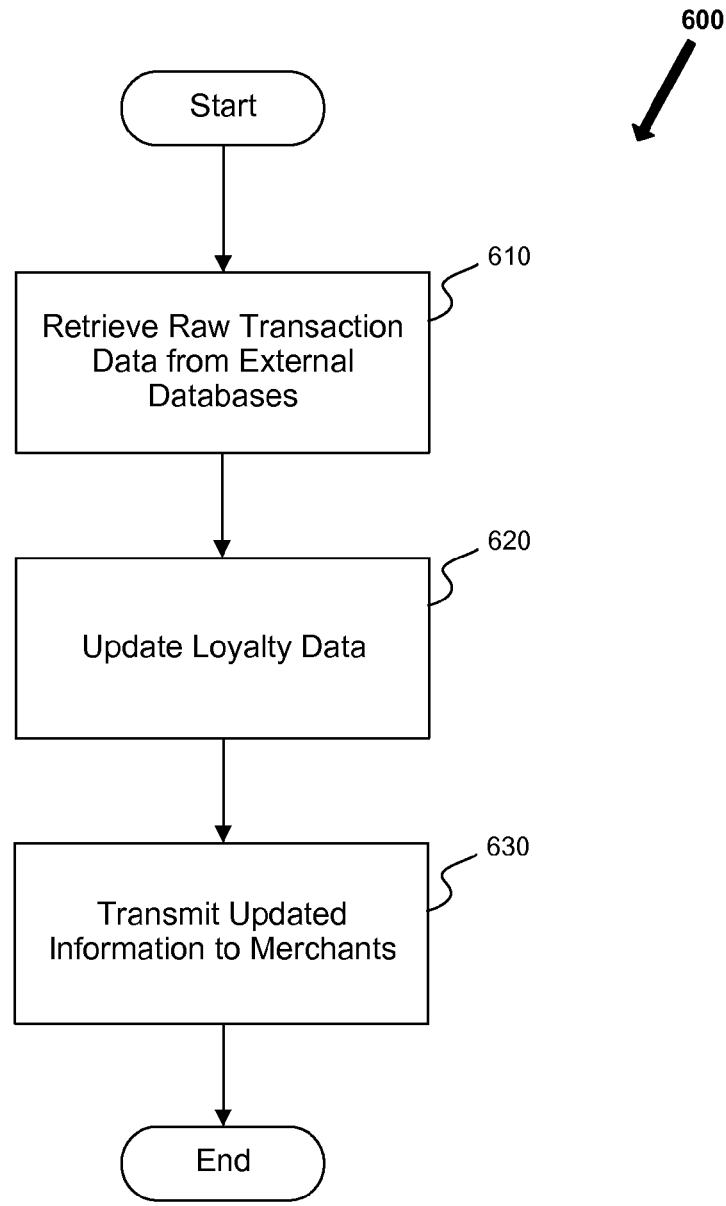
FIG. 17 is a detailed flow diagram depicting the steps performed to manage a customer loyalty program in accordance with the present invention.

FIG. 17 is a detailed flow diagram depicting the steps performed in step 600 of FIG. 13. The transaction processing system 26, as shown in step 610, periodically retrieves raw transaction data from secondary storage device 94. This retrieval can be performed at a predetermined time each day, or it can be performed shortly after the transaction is completed. In any event, the raw transaction data consists of customer profile information 102, merchant information 104, loyalty program information 108, transaction information 110, and customer personal information 114. This data is collected and analyzed for different purposes such as determining the effectiveness of the transaction processing system 26, refining and developing new, related products, and developing, tracking and analyzing loyalty programs and special promotions that are of specific interest to transaction processing system 26 customers and merchants. In addition, the information may be sold to merchant companies 12 and payment processing systems 16 to provide personalized service to individual customers. It is expected that merchant companies would pay for data from transaction processing system 26 based on volume or a per project basis. In step 620, the transaction processing system 26 updates loyalty data and in step 630, the updated information is transmitted to merchants who desire the additional data customer transaction data with demographic data that may be used to track customer purchasing trends.

Although the present invention has been described in terms of particularly preferred embodiments, it is not limited to these embodiments. Alternative embodiments and modifications which would still be encompassed by the invention may be made by those skilled in the art, particularly in light of the foregoing teachings. Therefore, this invention is intended to cover any alternative embodiments, modifications or equivalents which may be within the spirit and scope of the invention.

What is claimed is:

1. A method for enrolling users in a transaction processing program, comprising:
   receiving transmitter identification data and payment information for an unenrolled user at a point-of-sale device, wherein said payment information corresponds to a credit card, debit card, or bank account, or a combination thereof;
   electronically associating said transmitter identification data with said payment information;
   transmitting said associated transmitter identification data and said payment information to a host transaction processing system;
   electronically enrolling the user associated with a customer transponder into the transaction processing program at the time of a transaction request by storing enrollment data comprising said associated transmitter identification data and said payment information in said host transaction processing system; and
   providing a second customer transponder associated with the transmitter identification data to the user at the time of the transaction request.

2. The method of claim 1, further comprising transmitting additional customer information to said host transaction processing system, associating said additional customer information with said transmitter identification data and said payment information, and storing said associated additional customer information, transmitter identification data and said payment information.

3. The method of claim 1, wherein the providing the customer transponder and receiving the transmitter data and payment information occurs at a merchant location.

4. The method of claim 1, further comprising:
   verifying the payment information.

5. A method for enrolling users in a transaction processing program, comprising:
   receiving transmitter identification data and payment information for an unenrolled user at one of a plurality of point-of-sale devices, wherein said payment information corresponds to a credit card, debit card, or bank account, or a combination thereof;
   transmitting said transmitter identification data and said payment information to a host transaction processing system;
   electronically assigning a unique customer identifier that corresponds to said transmitter identification data;
   associating said unique customer identifier, said transmitter identification data and said payment information;
   electronically enrolling the user associated with a customer transponder into the transaction processing program at the time of a transaction request by storing enrollment data comprising said associated unique customer identifier, transmitter identification data and payment information in said host transaction processing system; and providing a second customer transponder associated with the transmitter identification data to the user at the time of the transaction request.

6. The method of claim 5, further comprising transmitting additional customer information to said host transaction processing system, associating said additional customer information with said transmitter identification data and said payment information, and storing said associated additional customer information, transmitter identification data and said payment information.

7. The method of claim 5, wherein the providing the customer transponder and receiving the transmitter data and payment information occurs at a merchant location.

8. The method of claim 5, further comprising:
verifying the payment information.

9. A system, comprising:
a merchant reader that receives transmitter identification data and payment information, electronically associates said transmitter identification data with said payment information, and transmits said associated transmitter identification data and said payment information to a host transaction processing system, wherein said payment information corresponds to a credit card, debit card, or bank account, or a combination thereof; and a host processing system that receives said transmitted information and enrolls the user associated with a customer transmitter into the transaction processing program at the time of a transaction request by storing enrollment data comprising said associated transmitter identification data and said payment information in said host transaction processing system, wherein the user is provided with a second customer transmitter associated with the transmitter identification data at the time of the transaction request.

10. The system of claim 9, wherein said merchant reader receives additional customer information and transmits the additional customer information to said host transaction processing system, and wherein said host processing system associates said additional customer information with said transmitter identification data and said payment information, and stores said associated additional customer information, transmitter identification data and said payment information.

11. The system of claim 9, wherein said merchant reader is associated with a point-of-sale device.

12. A system, comprising:
a merchant reader that receives transmitter identification data and payment information for an unenrolled user and transmits said transmitter identification data and said payment information to a host transaction processing system, wherein said payment information corresponds to a credit card, debit card, or bank account, or a combination thereof; and a host transaction processing system that electronically assigns a unique customer identifier that corresponds to said transmitter identification data, associates said unique customer identifier, said transmitter identification data and said payment information, and enrolls the user associated with a customer transmitter into the transaction processing system at the time of a transaction request by storing enrollment data comprising said associated unique customer identifier, transmitter identification data and payment information in said host transaction processing system, wherein the user is provided with a second customer transmitter associated with the transmitter identification data at the time of the transaction request.

13. The system of claim 12, wherein said merchant reader receives additional customer information and transmits the additional customer information to said host transaction processing system, and wherein said host processing system associates said additional customer information with said transmitter identification data and said payment information, and stores said associated additional customer information, transmitter identification data and said payment information.

14. The system of claim 12, wherein said merchant reader is associated with a point-of-sale device.

15. A method for enrolling users in a transaction processing program, comprising:
receiving transmitter identification data and payment information for an unenrolled user at a point-of-sale device, wherein said payment information corresponds to a credit card, debit card, or bank account, or a combination thereof;

automatically associating said transmitter identification data with said payment information;

transmitting said associated transmitter identification data and said payment information to a host transaction processing system;

automatically enrolling the user associated with a customer transponder into the transaction processing program at the time of a transaction request by storing enrollment data comprising said associated transmitter identification data and said payment information in said host transaction processing system; and providing a second customer transponder associated with the transmitter identification data to the user at the time of the transaction request.

16. The method of claim 15, further comprising transmitting additional customer information to said host transaction processing system, associating said additional customer information with said transmitter identification data and said payment information, and storing said associated additional customer information, transmitter identification data and said payment information.

17. A method for enrolling users in a transaction processing program, comprising:
receiving transmitter identification data and payment information for an unenrolled user at one of a plurality of point-of-sale devices, wherein said payment information corresponds to a credit card, debit card, or bank account, or a combination thereof;

transmitting said transmitter identification data and said payment information to a host transaction processing system;

automatically assigning a unique customer identifier that corresponds to said transmitter identification data;

associating said unique customer identifier, said transmitter identification data and said payment information;

automatically enrolling the user associated with a customer transponder into the transaction processing program at the time of a transaction request by storing enrollment data comprising said associated unique customer identifier, transmitter identification data and payment information in said host transaction processing system; and providing a second customer transponder associated with the transmitter identification data to the user at the time of the transaction request.

18. The method of claim 17, further comprising transmitting additional customer information to said host transaction processing system, associating said additional customer information with said transmitter identification data and said payment information, and storing said associated additional customer information, transmitter identification data and said payment information.

* * * * *

UNITED STATES PATENT AND TRADEMARK OFFICE
CERTIFICATE OF CORRECTION

| | | |
|---|---|---|
| PATENT NO. | : 8,538,801 B2 | Page 1 of 1 |
| APPLICATION NO. | : 10/083249 | |
| DATED | : September 17, 2013 | |
| INVENTOR(S) | : Giordano et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1369 days.

Signed and Sealed this
Seventeenth Day of February, 2015

Michelle K. Lee
*Deputy Director of the United States Patent and Trademark Office*